US012117126B2

(12) United States Patent
Morris et al.

(10) Patent No.: US 12,117,126 B2
(45) Date of Patent: Oct. 15, 2024

(54) METHODS FOR STORAGE AND TRANSPORTATION OF NATURAL GAS IN LIQUID SOLVENTS

(71) Applicant: SEAONE HOLDINGS, LLC, Houston, TX (US)

(72) Inventors: Ian Morris, Cambell River (CA); Bruce Hall, Houston, TX (US); Tolulope O. Okikiolu, Houston, TX (US)

(73) Assignee: SEAONE HOLDINGS, LLC, Houston, TX (US)

( * ) Notice: Subject to any disclaimer, the term of this patent is extended or adjusted under 35 U.S.C. 154(b) by 0 days.

(21) Appl. No.: 18/377,047

(22) Filed: Oct. 5, 2023

(65) Prior Publication Data

US 2024/0159361 A1 May 16, 2024

Related U.S. Application Data

(63) Continuation of application No. 17/699,866, filed on Mar. 21, 2022, now Pat. No. 11,815,226, which is a (Continued)

(51) Int. Cl.
*F17C 11/00* (2006.01)
*B63B 25/08* (2006.01)

(52) U.S. Cl.
CPC ....... *F17C 11/007* (2013.01); *B63B 2025/087* (2013.01); *F17C 2205/0107* (2013.01); (Continued)

(58) Field of Classification Search
CPC ............ F17C 11/007; F17C 2205/0107; F17C 2205/013; F17C 2223/0123; F17C 2270/0105; B63B 2025/087
See application file for complete search history.

(56) References Cited

U.S. PATENT DOCUMENTS 3,298,805 A 1/1967 Secord et al.
5,315,054 A 5/1994 Teel
(Continued)

FOREIGN PATENT DOCUMENTS

WO WO 90/00589 A1 1/1990

OTHER PUBLICATIONS

AU, 2011316568 Examination Report No. 1, Aug. 1, 2015.
(Continued)

*Primary Examiner* — Elizabeth J Martin
(74) *Attorney, Agent, or Firm* — ONE LLP

(57) ABSTRACT

Systems and methods to create and store a liquid phase mix of natural gas absorbed in light-hydrocarbon solvents under temperatures and pressures that facilitate improved volumetric ratios of the stored natural gas as compared to CNG and PLNG at the same temperatures and pressures of less than −80° to about −120° F. and about 300 psig to about 900 psig. Preferred solvents include ethane, propane and butane, and natural gas liquid (NGL) and liquid pressurized gas (LPG) solvents. Systems and methods for receiving raw production or semi-conditioned natural gas, conditioning the gas, producing a liquid phase mix of natural gas absorbed in a light-hydrocarbon solvent, and transporting the mix to a market where pipeline quality gas or fractionated products are delivered in a manner utilizing less energy than CNG, PLNG or LNG systems with better cargo-mass to containment-mass ratio for the natural gas component than CNG systems.

20 Claims, 29 Drawing Sheets

Related U.S. Application Data continuation of application No. 17/015,848, filed on Sep. 9, 2020, now Pat. No. 11,280,451, which is a continuation of application No. 16/134,640, filed on Sep. 18, 2018, now Pat. No. 10,801,672, which is a continuation of application No. 15/387,360, filed on Dec. 21, 2016, now Pat. No. 10,100,980, which is a continuation of application No. 14/881,619, filed on Oct. 13, 2015, now Pat. No. 9,574,710, which is a continuation of application No. 13/272,136, filed on Oct. 12, 2011, now Pat. No. 9,182,080.

(60) Provisional application No. 61/392,135, filed on Oct. 12, 2010.

(52) U.S. Cl.
CPC .................. *F17C 2205/013* (2013.01); *F17C 2223/0123* (2013.01); *F17C 2270/0105* (2013.01)

(56) References Cited

U.S. PATENT DOCUMENTS

| | | | |
|---|---|---|---|
| 5,803,005 | A | 9/1998 | Stenning et al. |
| 5,839,383 | A | 11/1998 | Stenning et al. |
| 6,003,460 | A | 12/1999 | Stenning et al. |
| 6,085,828 | A | 7/2000 | Wagstaff et al. |
| 6,449,961 | B1 | 9/2002 | Korsgaard |
| 6,460,721 | B2 | 10/2002 | Bowen et al. |
| 6,560,988 | B2 | 5/2003 | Kimble et al. |
| 6,655,155 | B2 | 12/2003 | Bishop |
| 6,725,671 | B2 | 4/2004 | Bishop |
| 6,751,985 | B2 | 6/2004 | Kimble et al. |
| 6,877,454 | B2 | 4/2005 | Bowen et al. |
| 6,994,104 | B2 | 2/2006 | Bishop et al. |
| 7,147,124 | B2 | 12/2006 | Minta et al. |
| 7,219,682 | B2 | 5/2007 | Agnew et al. |
| 7,257,952 | B2 | 8/2007 | Bishop et al. |
| 7,360,367 | B2 | 4/2008 | Hubbard |
| 10,100,980 | B2 | 10/2018 | Morris et al. |
| 2003/0094002 | A1 | 5/2003 | Hibino et al. |
| 2006/0042273 | A1 | 3/2006 | Morris et al. |
| 2007/0017575 | A1 | 1/2007 | Hall et al. |
| 2008/0287726 | A1 | 11/2008 | Holman |
| 2010/0000252 | A1 | 1/2010 | Morris et al. |
| 2010/0058784 | A1 | 3/2010 | Pek |
| 2011/0041518 | A1 | 2/2011 | Peterson et al. |
| 2012/0017639 | A1 | 1/2012 | Peterson et al. |
| 2014/0116069 | A1 | 5/2014 | Peterson et al. |

OTHER PUBLICATIONS

AU, 2016222510 Examination Report No. 1, Oct. 19, 2016.
CA, 2,816,295 Examiner's Report, Nov. 28, 2017.
EP, 11773160.4 Communication, Dec. 6, 2016.
JP, 2013-533981 Office Action, Feb. 1, 2016.
JP, 2013-533981 Final Office Action, Nov. 1, 2016.
KR, 10-2013-7012126 Office Action, Dec. 19, 2017.
WO, PCT/US2011/056009 ISR and Written Opinion, Feb. 16, 2012.

(M/M = Mass of Contained Natural Gas/Mass of steel in Containment System)

Note: Contained Natural Gas in CGL Mix is net value of Natural Gas within the Mix 180
181
183

182

184
183
181

METHODS FOR STORAGE AND TRANSPORTATION OF NATURAL GAS IN LIQUID SOLVENTS

CROSS REFERENCE TO RELATED APPLICATIONS

This application is a continuation of U.S. patent application Ser. No. 17/699,866, filed Mar. 21, 2022, which is a continuation of U.S. patent application Ser. No. 17/015,848, filed Sep. 9, 2020, now U.S. Pat. No. 11,280,451, which is a continuation of U.S. patent application Ser. No. 16/134,640, filed Sep. 18, 2018, now U.S. Pat. No. 10,801,672, which is a continuation of U.S. patent application Ser. No. 15/387,360, filed Dec. 21, 2016, now U.S. Pat. No. 10,100,980, which is a continuation of U.S. patent application Ser. No. 14/881,619, filed Oct. 13, 2015, now U.S. Pat. No. 9,574,710, which is a continuation of U.S. patent application Ser. No. 13/272,136, filed Oct. 12, 2011, now U.S. Pat. No. 9,182,080, which claims the benefit of U.S. Provisional Appl. No. 61/392,135, filed Oct. 12, 2010, which are fully incorporated by reference.

FIELD

The embodiments described herein relate to the process and method for storage and transportation and delivery of natural gas under conditions of pressure and temperature utilizing the added presence of liquid form of light-hydrocarbon solvents to facilitate greater density levels for the natural gas component of the mixture.

BACKGROUND INFORMATION

Natural gas is primarily moved by pipelines on land. Where it is impractical or prohibitively expensive to move the product by pipeline, LNG shipping systems have provided a solution above a certain threshold of reserve size. With the increasingly expensive implementation of LNG systems being answered by economies of scale of larger and larger facilities, the industry has moved away from a capability to service the smaller and most abundant reserves. Many of these reserves are remotely located and have not been economical to exploit using LNG systems.

Recent work by the industry seeks to improve delivery capabilities by introducing floating LNG liquefaction plants and storage at the gas field and installing on board re-gasification equipment on LNG carriers for offloading gas offshore to nearby market locations that have opposed land based LNG receiving and processing terminals. To further reduce energy consumption by simplification of process needs, the use of pressurized LNG (PLNG) is once again under review by the industry for improvement of economics in an era of steeply rising costs for the LNG industry as a whole. See, e.g., U.S. Pat. Nos. 3,298,805; 6,460,721; 6,560,988, 6,751,985; 6,877,454; 7,147,124; 7,360,367.

The demanding economics of fringe area development of reserves of “stranded gas” worldwide dictate improvements of service beyond those offered by floating LNG and pressurized LNG technologies for full exploitation of this energy source.

The advent of Compressed Natural Gas (CNG) transportation systems, to cater to the needs of a world market of increasing demand, has led to many proposals in the past decade. However, during this same time period there has only been one small system placed into full commercial service on a meaningful scale. CNG systems inherently battle design codes that regulate wall thicknesses of their containment systems with respect to operating pressures. The higher the pressure, the better the density of the stored gas with diminishing returns—however, the limitations of “mass of gas-to-mass of containment material” have forced the industry to look in other directions for economic improvements on the capital tied up in CNG containment and process equipment. See, e.g., U.S. Pat. Nos. 5,803,005; 5,839,383; 6,003,460; 6,449,961, 6,655,155; 6,725,671; 6,994,104; 7,257,952.

One solution outlined in U.S. Pat. No. 7,607,310, which is incorporated herein by reference, provides a methodology to both create and store a liquid phase mix of natural gas and light-hydrocarbon solvent under preferred temperature conditions of below −40° to about −80° F. and preferred pressure conditions of about 1200 psig to about 2150 psig. The liquid phase mix of natural gas and light-hydrocarbon solvent is referred to hereafter as Compressed Gas Liquid (CGL) product or mixture. Although the CGL technology enables improved cargo density with the combination of lower process energy for a liquid state storage not attainable by LNG, PLNG and CNG systems and processes, the demanding economics of fringe area development of reserves dictate the need to increase cargo density, reduce process energy, and reduce containment vessel mass.

Accordingly, it is desirable to provide systems and methods that facilitate economic development of remote or stranded reserves to be realized by a means not afforded by LNG, PLNG or CNG systems and utilize CGL systems and process for natural gas storage to realize increased cargo density, reduction of process energy, and reduction in containment vessel mass inherent.

SUMMARY

Embodiments provided herein are directed to systems and methods to both create and store a denser liquid phase mix of natural gas and light-hydrocarbon solvent under temperature and pressure conditions that facilitate improved volumetric ratios of the stored gas within containment systems of lighter construction. In a preferred embodiment, improved density of storage of natural gas, as compared to compressed natural gas (CNG) and pressurized liquid natural gas (PLNG) at the same temperature and pressure conditions, is enabled using hydrocarbon solvents such as light-hydrocarbon based solvents including ethane, propane and butane, a natural gas liquid (NGL) based solvent or a liquid petroleum gas (LPG) based solvent under overall temperature conditions from less than −80° F. to about −120° F. with overall pressure conditions ranging from about 300 psig to about 1800 psig, and under enhanced pressure conditions ranging from about 300 psig to less than 900 psig, or, more preferably, under enhanced pressure conditions ranging from about 500 psig to less than 900 psig.

The embodiments described herein are also directed to a scalable means of receiving raw production (including NGLs) or semi-conditioned natural gas, conditioning the gas, producing a compressed gas liquid (CGL) product comprising a liquid phase mix of the natural gas and the light-hydrocarbon solvent, and transporting the CGL product to a market where pipeline quality gas or fractionated products are delivered in a manner utilizing less energy than either CNG or LNG systems and giving a better ratio of cargo-mass to containment-mass for the natural gas component in the shipment than that offered by CNG systems.

Other systems, methods, features and advantages of the embodiments will be or will become apparent to one with skill in the art upon examination of the following figures and detailed description.

BRIEF DESCRIPTION OF THE FIGURES

The details of the embodiments, including fabrication, structure and operation, may be gleaned in part by study of the accompanying figures, in which like reference numerals refer to like parts. The components in the figures are not necessarily to scale, emphasis instead being placed upon illustrating the principles of the embodiments described herein. Moreover, all illustrations are intended to convey concepts, where relative sizes, shapes and other detailed attributes may be illustrated schematically rather than literally or precisely.

DETAILED DESCRIPTION OF THE PREFERRED EMBODIMENTS

Figure 1:
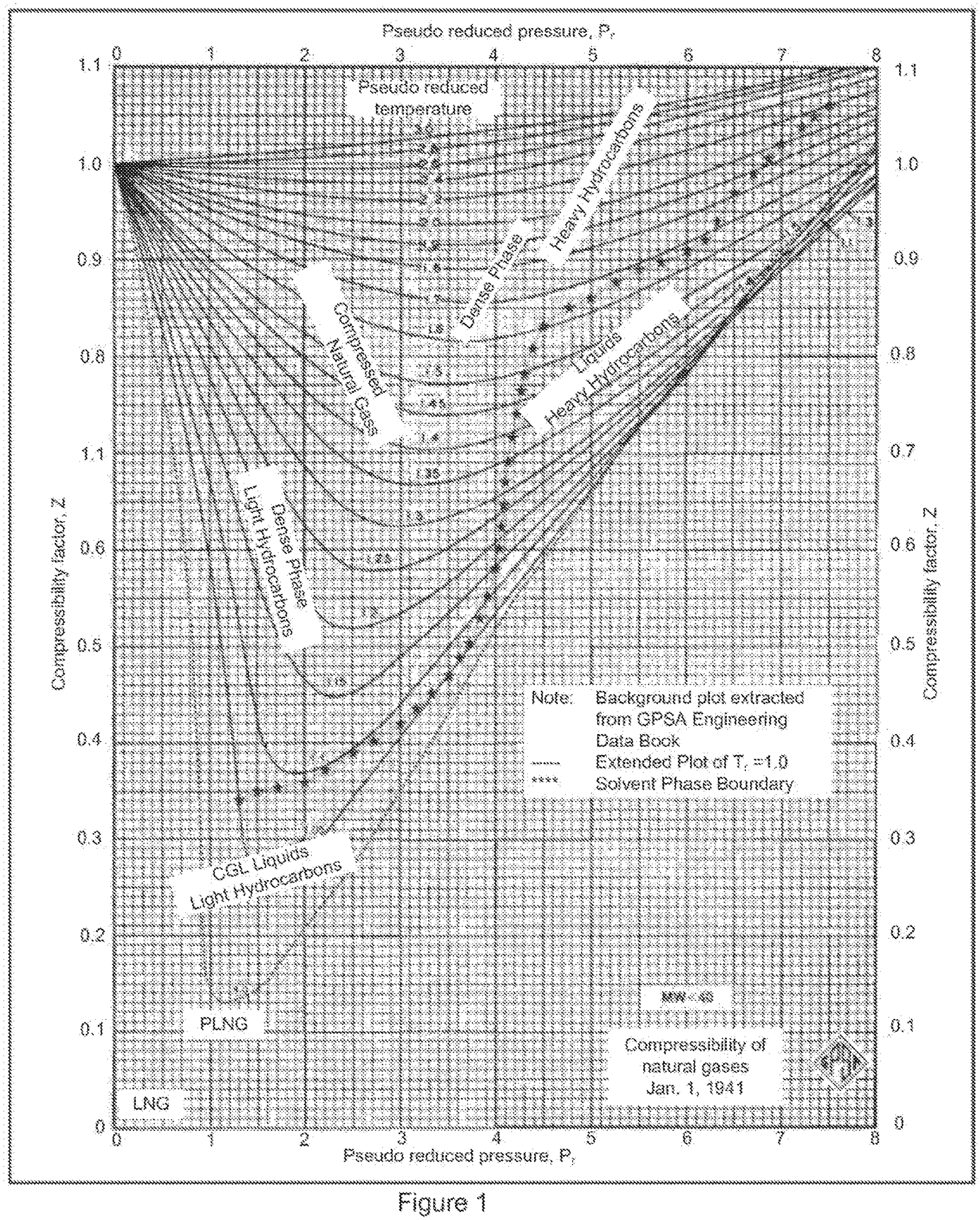
FIG. 1 is a natural gas compressibility factor (Z) chart at pseudo-reduced temperatures and pressures from the GPSA Engineering Data Book with an overlay of information related to LNG, PLNG, CNG and CGL.

Embodiments provided herein are directed to systems and methods to both create and store a liquid phase mix of natural gas and light hydrocarbon solvent under temperature and pressure conditions that facilitate improved volumetric ratios of the stored gas within containment systems of light construction. In a preferred embodiment, improved density of storage of natural gas, as compared to compressed natural gas (CNG) and pressurized liquid natural gas (PLNG) at the same temperature and pressure conditions, is enabled using hydrocarbon solvents such as light hydrocarbons based solvents such as ethane, propane and butane, a natural gas liquid (NGL) based solvent or a liquid petroleum gas (LPG) based solvent under temperature conditions from less than −80° F. to about −120° F. with overall pressure conditions ranging from about 300 psig to about 1800 psig, and under enhanced pressure conditions ranging from about 300 psig to less than 900 psig, or, more preferably, under enhanced and pressure conditions ranging from about 500 psig to less than 900 psig.

This application relates to U.S. application Ser. No. 12/486,627, filed Jun. 17, 2009, and U.S. Provisional Application No. 61/392,135, filed Oct. 12, 2010, which are fully incorporated by reference.

Before turning to the manner in which the present embodiments function, a brief review of the theory of ideal gases is provided. The combination of Boyles Law, Charles' Law and the Pressure Law yields the relationship for changing conditions under which a gas is stored:

$$(P1*V1)/T1=(P2*V2)/T2=\text{Constant} \quad (1)$$

Where P=Absolute Pressure
V=Gas Volume
T=Absolute Temperature

A value R is attributed to a fixed value, known as the Universal Gas Constant. Hence a general equation can be written as follows:

$$P*V=R*T \quad (2)$$

This ideal gas relationship is suited to low pressures, but falls short on accuracy for real gas behavior under higher pressures experienced in the practical world.

To account for the difference in intermolecular force behavior between an ideal gas and a real gas a corrective dimensionless compressibility factor known as z is introduced. The value of z is a condition of the gas constituents and the pressure and temperature conditions of containment. Hence:

$$P*V=z*R*T \quad (3)$$

Rewriting in the form of Molecular Mass (MW), the relationship takes the form:

$$P*V=z*R*T=(Z*R*T)/(MW) \quad (4)$$

where a specific value of z relative to the gas constituents, temperature and pressure, now referred to as Z is introduced. This equation is then rewritten to account for gas density ρ=1/V.

Hence:

$$\rho=P*(MW)/(Z*R*T) \quad (5)$$

This relationship is the origin for gas phase densities used in the embodiments described herein.

The Gas Processors Suppliers Association publishes an Engineering Data Book for the industry which shows the graphical relationship of Z for all light hydrocarbon mixes of molecular mass below a value of MW=40. Based on the Theorem of Corresponding States, this chart uses pseudo reduced values of the storage conditions of pressure and temperature to give the compressibility factor Z for all relevant light-hydrocarbon mixes irrespective of phase or constituent mix. The pseudo reduced values of temperature and pressure conditions are expressed as absolute values of these measured properties divided by the critical property of the subject hydrocarbon mix.

The embodiments described herein seek to accelerate the onset of a denser storage value of natural gas through the addition of light-hydrocarbon solvents. As can be seen from Equation (5), increased density is obtained where the value of Z decreases. In the selected area of operation of the embodiments described herein, the value of Z of natural gas is reduced by the introduction of a light-hydrocarbon solvent to the natural gas to create a liquid phase mixture of the solvent and natural gas referred to herein as a compressed gas liquid (CGL) mixture.

FIG. 1 shows a reproduction of the relevant part of this Z factor chart issued by the GPSA as "FIG 23-4". This part of the chart assumes the form of a series of catenary shaped curves originating from a common point of Z=1 and pressure=0 absolute units. The region of activity for CGL technology is located at the lower end of the curves shown on FIG. 1, where the values for Z approximate 0.3 or less. Computational improvements made to Equations of State and the Theorem of Corresponding States since the original publication of this chart in 1941 have enabled the calculation of an approximate performance line for the pseudo-reduced temperature Tr=1.0 to better define the region giving rise to the embodiments described herein. Also added is a line defined as a Solvent Phase Boundary, beneath which it was found that the accelerated onset of the liquid state is achieved through the addition of light-hydrocarbon solvents. CGL mixtures using solvents derived from light-hydrocarbon solvents, such as ethane, propane and butane lie at the base of the catenary curves shown here. Upwards and to the right lies a region defined as "liquids-heavy hydrocarbons" where C6 through C12 hydrocarbon solvents yield improvements in mixture density at much higher pressures and temperatures beyond the scope of the preferred embodiment. Chilled CNG (compressed natural gas) technologies occupy a region in the central left of the diagram where approximate values of Z lie between 0.4 and 0.7. Straight LNG at atmospheric pressure and −260° F. lies towards the lower left corner of the chart where the value of Z approaches zero (approx 0.01). PLNG occupies an intermediate inverted triangular region from the LNG point to the CGL zone. Compressed gas transmission pipelines operating at near atmospheric temperatures occupy the upper catenary bands and cluster towards the upper right point of origin of the curves. Values for Z for this mode of transport typically run about 0.95 down to 0.75 on the more efficient systems.

It is thus seen that all four storage technologies transition from LNG to PLNG to CGL to CNG moving from the lower left to upper right of the Z factor chart. Each is distinct in its own right, with the storage condition brought about through the application of cooling and compression. The heaviest energy loads relative to compressed state lie at the extremes of these storage conditions, in the LNG and CNG technologies. Heat of compression and required cooling for CNG and the last 50° F. of cooling (as noted by Woodall, U.S. Pat. No. 6,085,828) in the case of LNG justifies gravitating towards CGL technology in the mid field for storage conditions requiring the least energy input, which allows for more of a wellhead gas to be available for sale to the market.

Without limitation in the following quoted values, CGL technology offers the best storage compression for energy expenditure per unit of natural gas delivered. Measured against LNG at an approximate volumetric ratio (V/V) of 600:1, these alternatives require less exotic materials and processing to yield an upper V/V value for CGL of approximately 400:1 as described below.

Figure 2A:
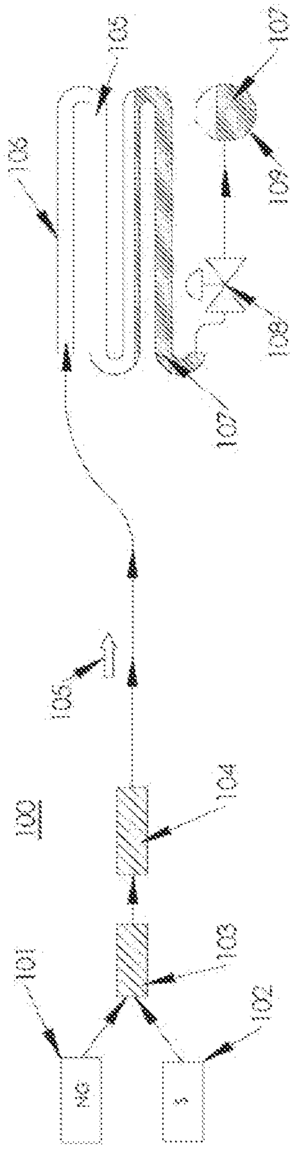
FIG. 2A is a schematic flow diagram of a process for producing CGL product and loading the CGL product into a pipeline containment system.

FIG. 2A illustrates the steps and system components in a process 100 comprising the production of CGL mixture comprising a liquid phase mixture of natural gas (or methane) and a light hydrocarbon solvent, and the storage of the CGL mixture in a containment system. For the CGL process 100, a stream of natural gas 101 is first prepared for containment using simplified standard industry process trains in which the heavier hydrocarbons, along with acidic gases, excess nitrogen and water, are removed to meet pipeline specifications as per the dictates of the field gas constituents. The gas stream 101 is then prepared for storage by compressing to a desired pressure, and then combining it with the light hydrocarbon solvent 102 in a static mixer 103 before cooling the resulting mixture to a preferred temperature in a chiller 104 to produce a liquid phase medium 105 referred to as the CGL product.

For a given storage condition defined by a temperature and pressure coordinate, it is found that there is a specific ratio of solvent to natural gas that yields the highest net volumetric ratio for the stored natural gas within the CGL mixture at the defined storage conditions for a predetermined solvent and composition of natural gas. In order to maintain the optimum volumetric ratio (storage efficiency), a control loop is built into the loading system. At frequent intervals, the control loop monitors the fluctuating composition of the input natural gas stream and adjusts the mol percentage of added solvent to maintain an optimum storage density of the resulting CGL mixture.

Figure 2D:
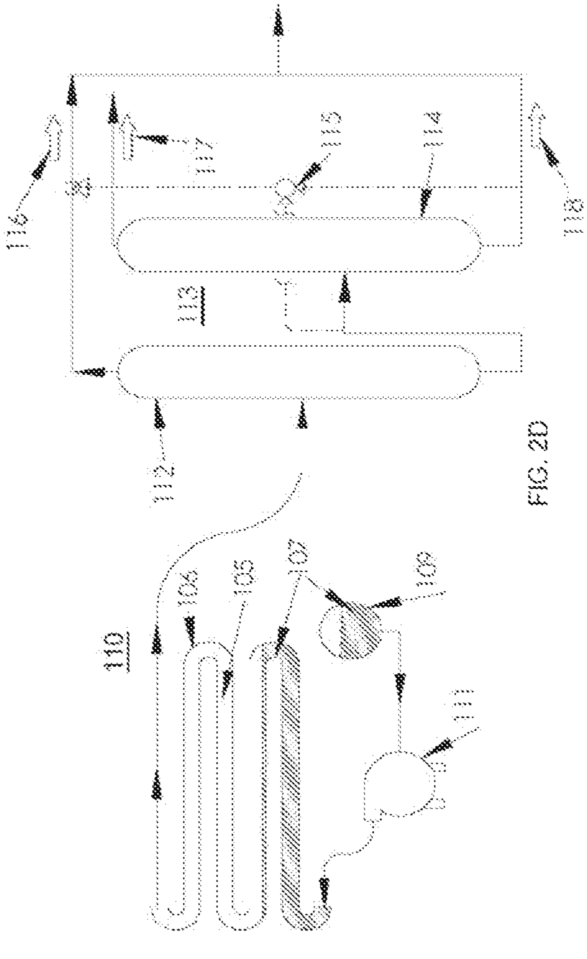
FIG. 2D is a schematic flow diagram of a process for unloading CGL product from the containment system and separating the natural gas and solvent of the CGL product.
Figure 2B:
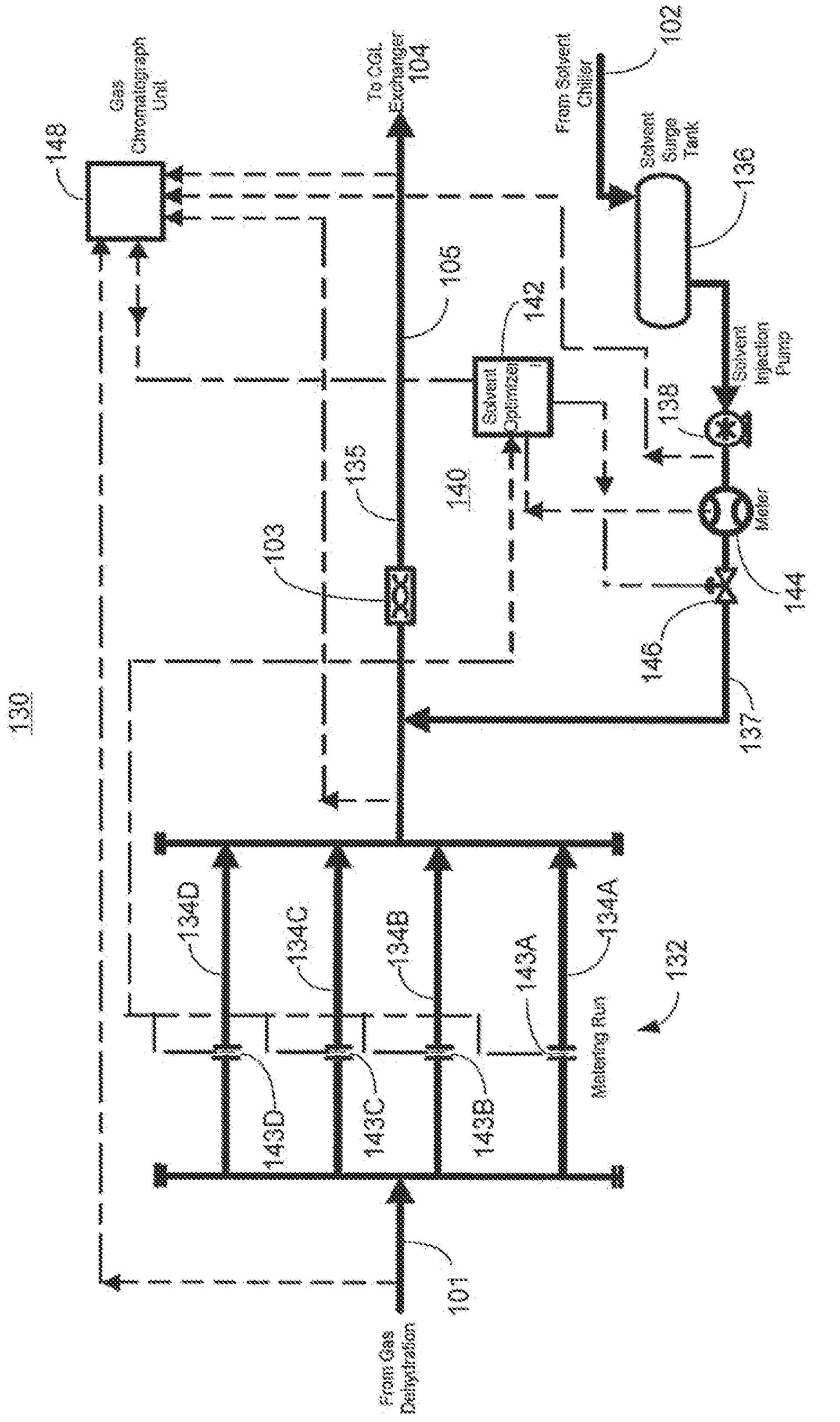
FIG. 2B is a schematic flow diagram of a process for producing CGL product with a solvent optimization control loop to maximize storage efficiency of the original gas.

Turning to FIG. 2B, an example of the steps and system components in a process 130 for producing the CGL product with a solvent optimization control loop 140 to maximize storage efficiency of the original gas is illustrated. As depicted, the system components of the CGL production process 130 include a metering run 132 that receives gas 101 from a gas dehydration unit. The metering run includes a plurality of individual runs 134A, 134B, 134C and 134D with a flow meter or sensor 143A, 143B, 143C and 143D disposed therein. The metering run 132 feeds the gas 101 to a static mixer 103 which combines a light hydrocarbon solvent 102 with the gas 101 to form the CGL product 105. The solvent 102 is fed through a solvent injection line 137 by a solvent injection pump 138 to the static mixer 103 from a solvent surge tank 136 which receives the solvent 102 from a solvent chiller. The CGL product 105 is discharged from the static mixer 103 along a CGL product discharge line 135 to a CGL heat exchanger 104.

As depicted, the solvent optimizer control loop 140 includes a solvent optimizer unit or controller 142, which has a processor upon which a solvent optimizer software program runs. The solvent optimizer unit 142 is coupled to a solvent flow meter 144 disposed in the solvent injector line 137 after the solvent injection pump 138. The solvent optimizer unit 142 is also coupled to a flow control valve 146 disposed in the solvent injector line 137 after the solvent flow meter 144. The solvent optimizer control loop 140 further includes a gas chromatograph unit 148 coupled to the solvent optimizer unit 142.

In operation, the gas chromatograph unit 148 determines the composition of the incoming gas 101 received from a location prior to the metering run 132 and/or a location prior to the static mixer 103. The gas chromatograph unit 148 determines the composition of the incoming solvent 102 received from a location in the injection line 137 prior to the flow meter 144 and the composition of the outgoing warm CGL product 105 received from a location in the discharge line 135 prior to the CGL exchanger 104. The composition of the gas 101, solvent 102 and CGL product 105 is communicated by the gas chromatograph unit 148 to the solvent optimizer unit 142. The solvent optimizer unit 142 also receives the flow rate of the gas 101 from the flow sensors 143A, 143B, 143C and 143D and the flow rate of the solvent 102 from the flow meter 144. As discussed with regard to FIG. 2C, the solvent optimizer unit 142 uses this data to calculate an optimum volumetric ratio of the gas 101 and the corresponding solvent-to-gas mixture ratio to achieve the optimum volumetric ratio of the gas 101, and control the flow control valve 146 to maintain the optimum solvent-to-gas mixture ratio.

Figure 2C:
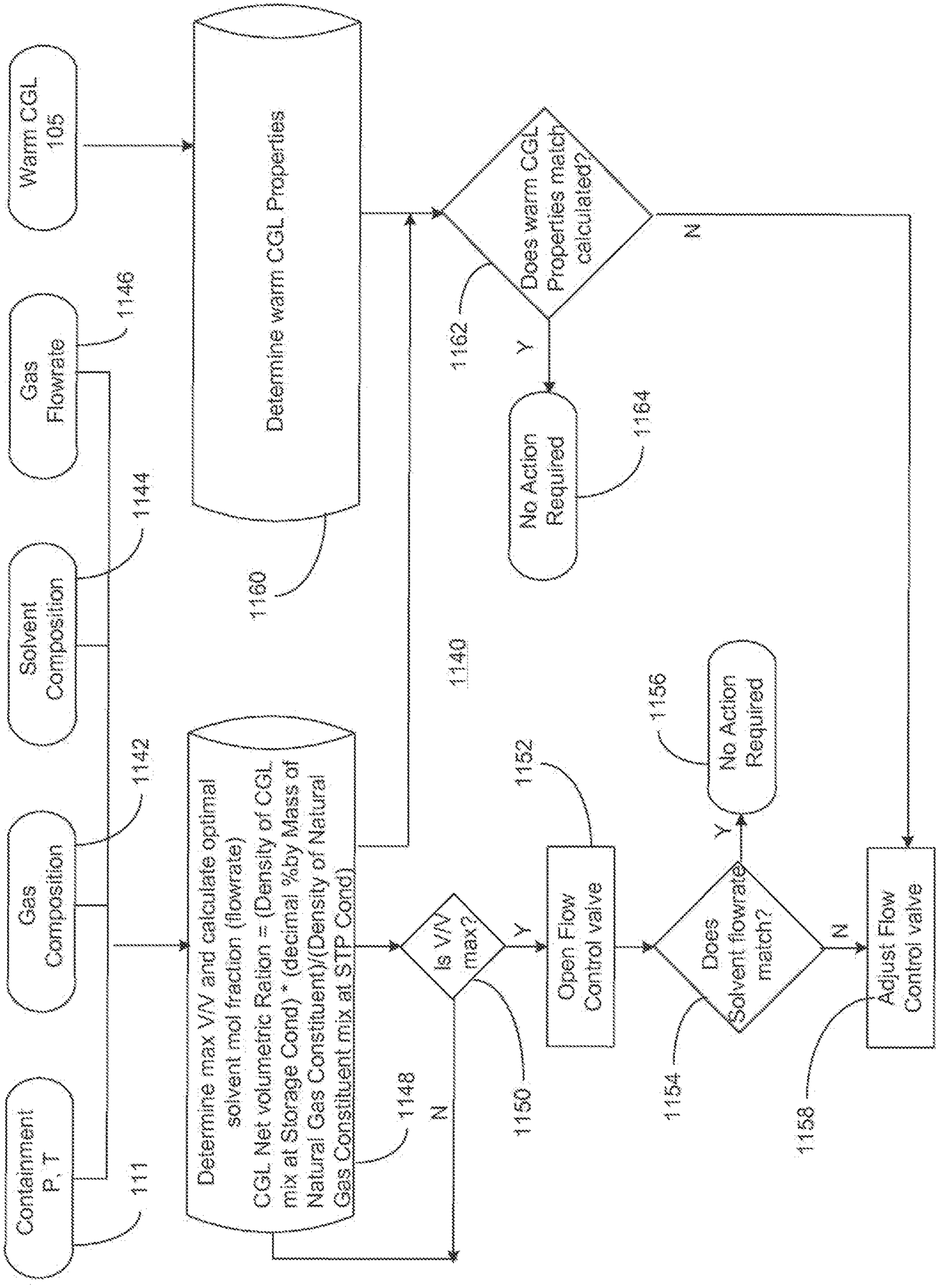
FIG. 2C is a flow chart illustrating the steps in a control process for solvent optimization in the production of the CGL to maximize storage efficiency of the original gas.

As depicted in FIG. 2C, a control process 1140 for solvent optimization includes the determination of the composition of the gas 101 at step 1142, the determination of the composition of the solvent 102 at step 1144 and the determination of the flow rate of the gas 101 at step 1146. At step 1148, an optimization program takes the composition of the gas 101 and the solvent 102, and a range of storage conditions, i.e., containment temperatures and pressures 111, input from a user, and calculates the volumetric ratio (storage efficiency) of the gas 101 component of the CGL product 105, i.e., the net volumetric ratio of the gas 101 component of the CGL product 105, over a range of pressures, temperatures and solvent-to-gas mixture ratios (solvent mol fraction) to find the solvent-to-gas mixture ratio that maximizes the storage efficiency of the original gas. The net volumetric ratio of the gas 101 component of the CGL product 105 is calculated as follows: Net Volumetric Ratio=(Density of the CGL mix at storage conditions)*(decimal % by mass of natural gas constituent)/(Density of natural gas constituent at standard temperature and pressure conditions). The mixture of solvent and gas is determined by rules based on the thermodynamic equation of state in use. These equations of state (Peng Robinson, SRK, etc.) work based on thermodynamic properties of the hydrocarbon gas 101 and solvent 102 components.

As step 1150 indicates, the program continues to calculate the net volumetric ratio until it determines that increasing the solvent-to-gas ratio of the mixture does not allow for the storage of more of the gas for the storage conditions. Once the max volumetric ratio (V/V) is determined, the flow control valve is opened at step 1152 if it is not already open. At step 1154 the program determines if the actual flow rate of the solvent measured by the flow meter 144 matches the flow rate corresponding to the optimum solvent mol fraction calculated at step 1148. If the flow rates match, no action is required as indicated at step 1156. If the flow rates do not match, the flow control valve 146 is adjusted at step 1158.

An additional check is provided at steps 1160 and 1162 to insure that the proper solvent flow rate is being provided. As indicated, the composition of the warm CGL product 105 is determined at step 1160. At step 1162, the program compares the properties of a CGL product based on the calculated solvent-to-gas ratio with the properties of the warm CGL product 105. If the properties match, no action is required as indicated at step 1164. If the properties do not match, the program adjusts the flow control valve at step

1158 to produce a warm CGL product 105 with properties that match the properties of a CGL product based on the calculated solvent-to-gas ratio.

U.S. Pat. No. 7,607,310, which is incorporated herein by reference, describes a methodology to both create and store a supply of CGL product under temperature conditions of preferably ranging from less than −40° F. to about −80° F. and pressure conditions of about 1200 psig to about 2150 psig with storage densities for the natural gas component of the CGL product being greater than the storage densities of CNG for the same storage temperature and pressure.

FIG. 2D illustrates the steps and system components in a process 110 for unloading CGL product from the containment system and separating the natural gas and solvent of the CGL product. To unload the CGL product 105 from the containment piping 106, valve settings are revised, and the flow of displacement fluid 107 is reversed and moved by a pump 111 to flow back into the containment piping 106 to push the lighter CGL product 105 out of containment toward a fractionation train 113 having a separation tower 112 for separating the CGL product 105 into natural gas and solvent constituents. The natural gas exits the top of the tower 112 and is conveyed toward transmission pipelines. The solvent exits the base of the separation tower 112 and flows into a solvent recovery tower 114 where the recovered solvent is returned 117 to a CGL production system. A market specification natural gas can be obtained utilizing a natural gas BTU/Wobbe adjustment module 115 which meters any required heavier constituents as flowstream 118 back into the flowstream 116 to yield the originally loaded gas stream.

Figure 3A:
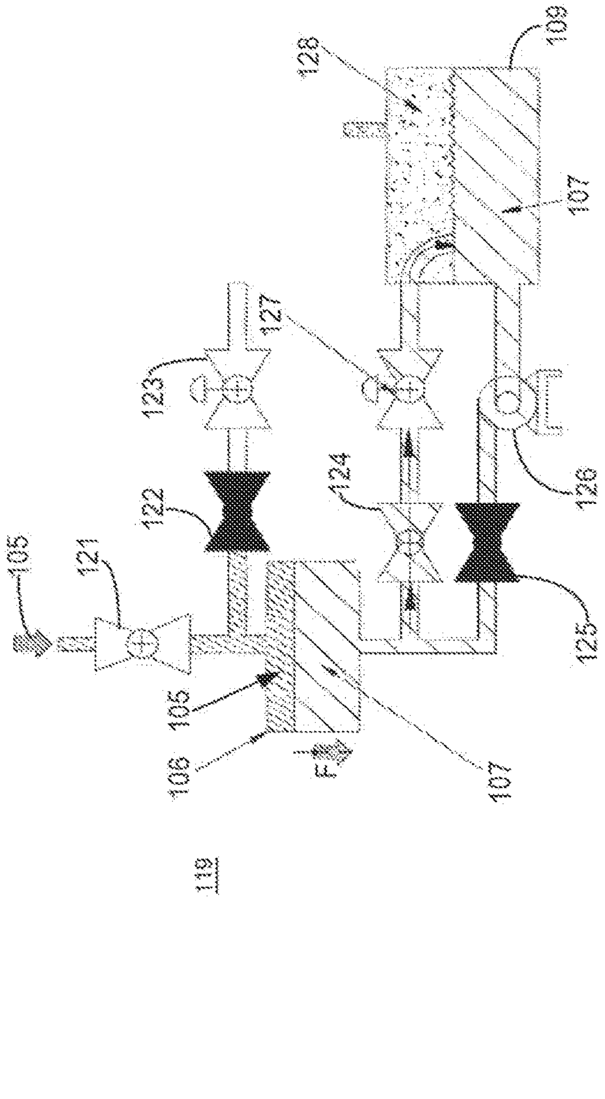
FIG. 3A is a schematic illustrating a displacement fluid principle for loading CGL product into a containment system.
Figure 3B:
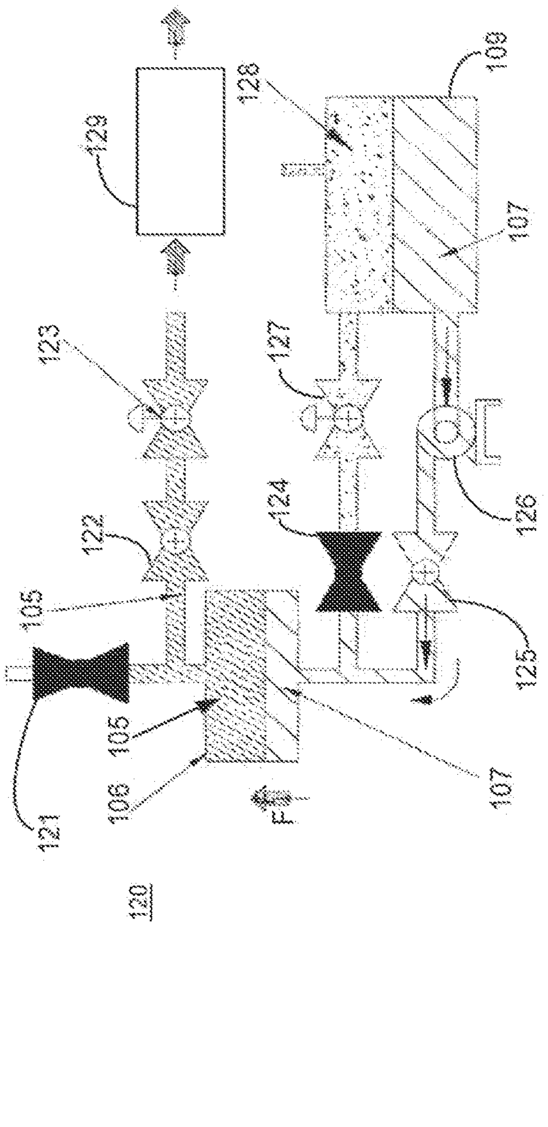
FIG. 3B is a schematic illustrating a displacement fluid principle for unloading CGL product out of a containment system.

Turning to FIGS. 3A and 3B the principle of using displacement fluid, which is common in other forms to the hydrocarbon industry, is illustrated under the storage conditions applicable to the specific horizontal tubular containment vessels or piping used in the disclosed embodiments. In a loading process 119, the CGL product 105 is loaded into the containment system 106 through an isolation valve 121, which is set to open in an inlet line, against the back pressure of the displacement fluid 107 to maintain the CGL product 105 in its liquid state. The displacement fluid 107 preferably comprises a mixture of methanol and water. An isolation valve 122 is set to closed in a discharge line.

As the CGL product 105 flows into the containment system 106 it displaces displacement fluid 107 causing it to flow through an isolation valve 124 positioned in a line returning to a displacement fluid tank 109 and set to open. A pressure control valve 127 in this return line retains the displacement fluid 107 at sufficient back pressure to ensure the CGL product 105 is maintained in a liquid state in the containment system 106. During the loading process, an isolation valve 125 in a displacement fluid inlet line is set to closed.

Upon reaching its destination, a transportation vessel or carrier transporting the CGL product 105 unloads the CGL product 105 from the containment system through an unloading process 120 that utilizes a pump 126 to reverse the flow F of the displacement fluid 107 from the storage tank 109 through an open isolation valve 125 to containment pipe bundles 106 to push the lighter CGL product 105 into a process header towards fractionating equipment of a CGL separation process train 129. The displaced CGL product 105 is removed from the containment system 106 against the back pressure of control valve 123 in the process header through isolation valve 122 which is now set to open. The CGL product 105 is held in the liquid state until this point, and only flashes to a gaseous/liquid process feed after passing through the pressure control valve 123. During this process, isolation valves 121 and 124 remain in the closed voyage setting.

In the further interests of the limited storage space on board a marine vessel, once the CGL load is pushed out of containment, valves 122 and 125 are closed and the displacement fluid 107 is returned by a low pressure line (not shown) to the tank 109 for reuse in the filling/emptying of a successive pipe bundle (not shown). The reused fluid is again delivered via pump 126 feeding a newly opened manifold valve (not shown) in succession to the now closed valve 125 to the successive pipe bundle. Meanwhile the pipeline containment 106, now drained of displacement fluid, is purged with a nitrogen blanket gas 128 to and left in an inert state as an "empty" isolated pipe bundle.

U.S. Pat. No. 7,219,682, which illustrates one such displacement fluid method adaptable to the embodiments described herein, is incorporated herein by reference.

Irrespective of containment material, containment mass ratios achievable in a CGL system are improved upon by storing the CGL product under temperature conditions from less than −80° to about −120° F. with pressure conditions ranging from about 300 psig to about 1800 psig and under enhanced pressure conditions ranging from about 300 psig to less than 900 psig or, more preferably, under enhanced pressure conditions ranging from about 500 psig to less than 900 psig.

Figure 4B:
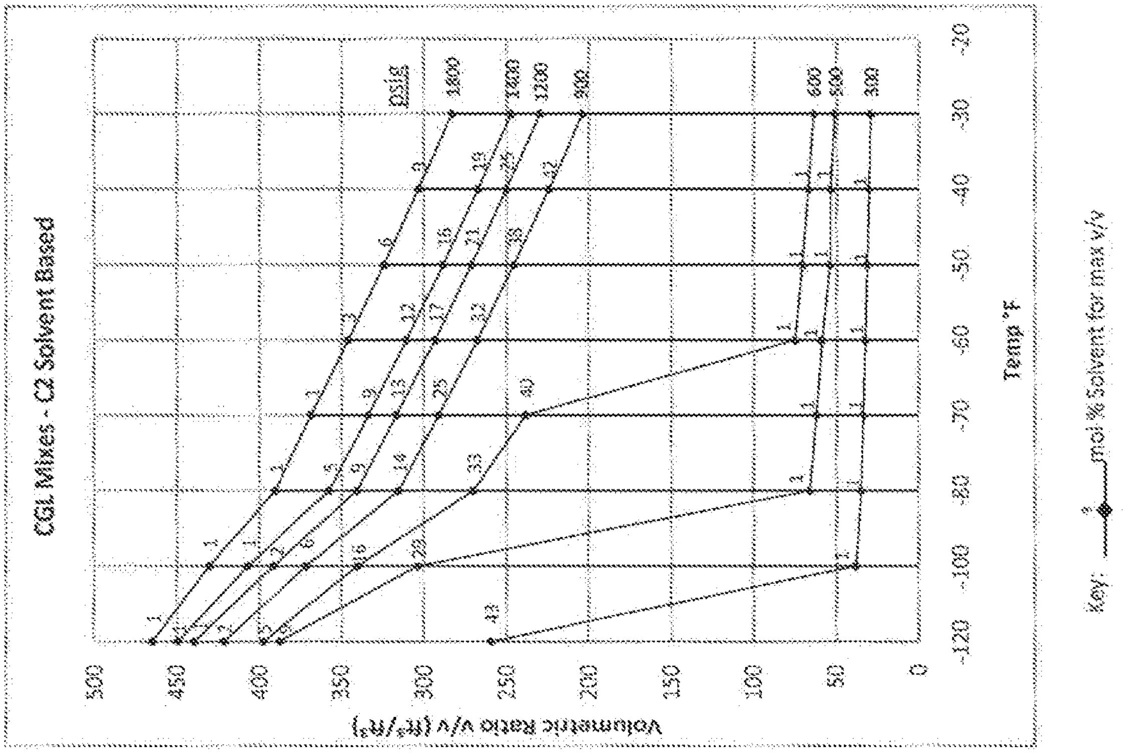
FIGS. 4A and 4B are graphs showing the volumetric ratio (v/v) of CNG and PLNG and the volumetric ratio of a natural gas component of an ethane solvent-based CGL mixture at the same storage temperatures and pressures.
Figure 4A:
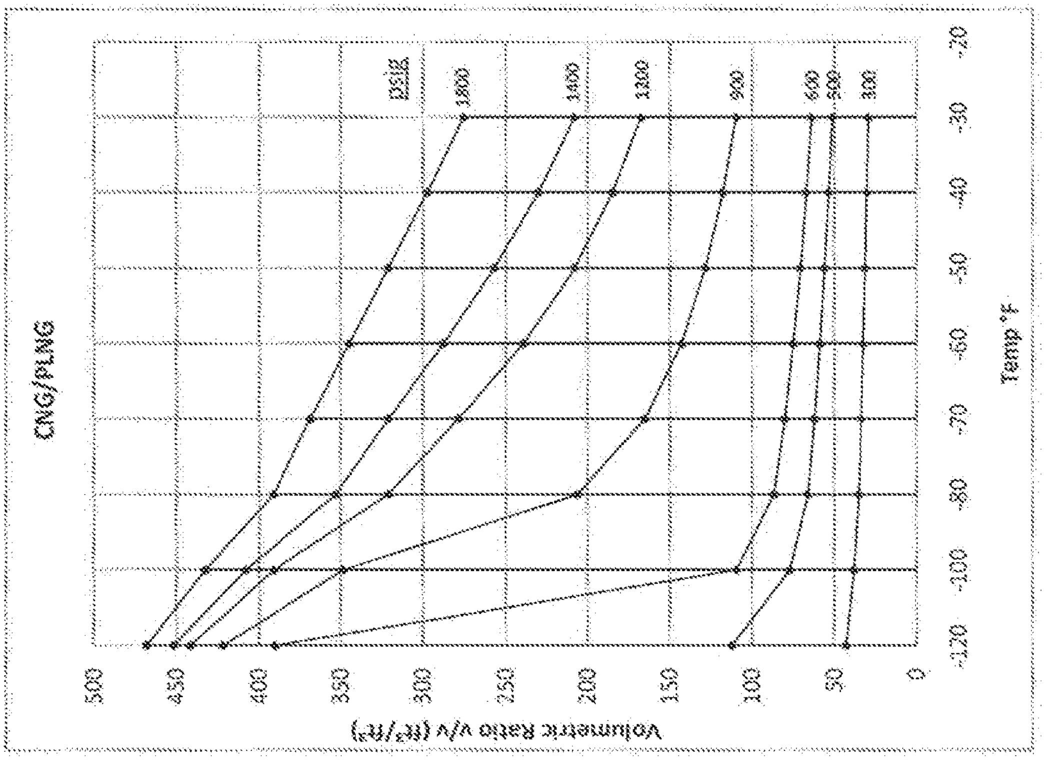

FIGS. 4A and B, 5A and B, 6A and B, 7A and B and 8A and B show the relative behavior of CGL mixtures and that of CNG and PLNG at the same temperature and pressure storage conditions. Performance is reported as the volumetric ratio (V/V) of each storage condition that is referenced as a particular pressure/temperature point. The V/V ratio expressed is the density of natural gas under storage conditions divided by the density of the same gas under standard conditions of one atmosphere of pressure and a temperature of 60° F. The CGL V/V value is a net density value of the natural gas component within the CGL product divided by the density of the same natural gas under standard conditions of one atmosphere of pressure and a temperature of 60° F. Thus, the two systems are examined on a common baseline of stored natural gas, irrespective of the solvent component in the CGL mixtures. As illustrated in FIGS. 4A and B, 5A and B, 6A and B, 7A and B and 8A and B, the natural gas cargo density is derived from a blend of gas representative of a typical North American sales product having a gross heating value (GHV) of 1050 Btu/ft$^3$ (SG=0.6 approx.)

Figure 5B:
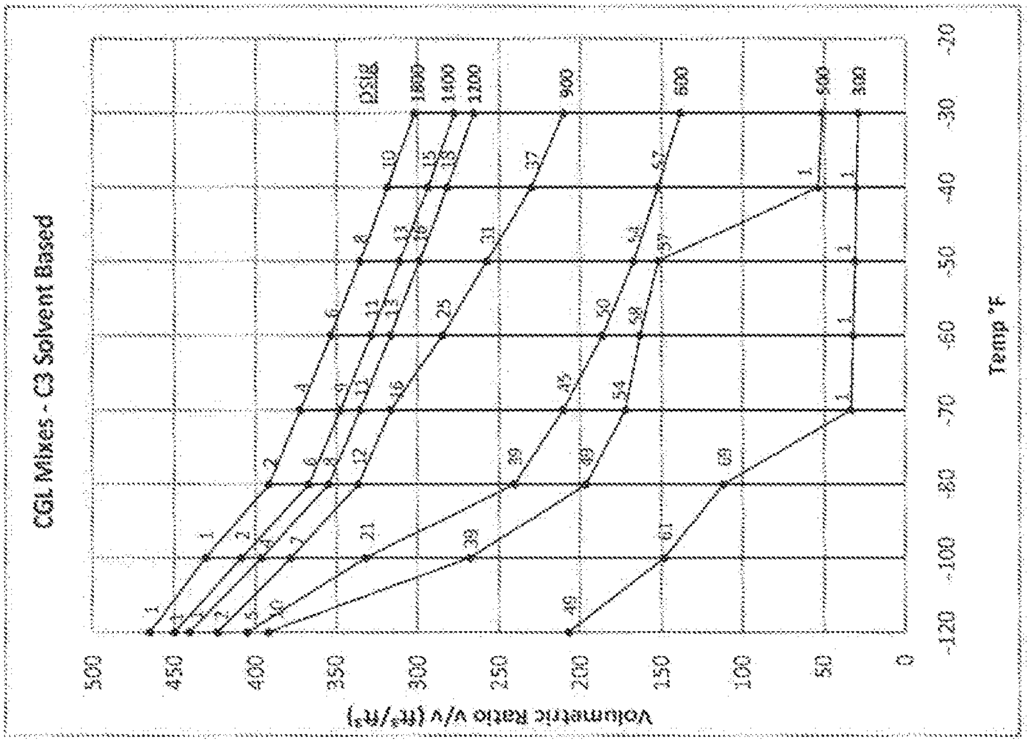
FIGS. 5A and 5B are graphs showing the volumetric ratio (v/v) of CNG and PLNG and the volumetric ratio of a natural gas component of a propane solvent-based CGL mixture at the same storage temperatures and pressures.
Figure 6B:
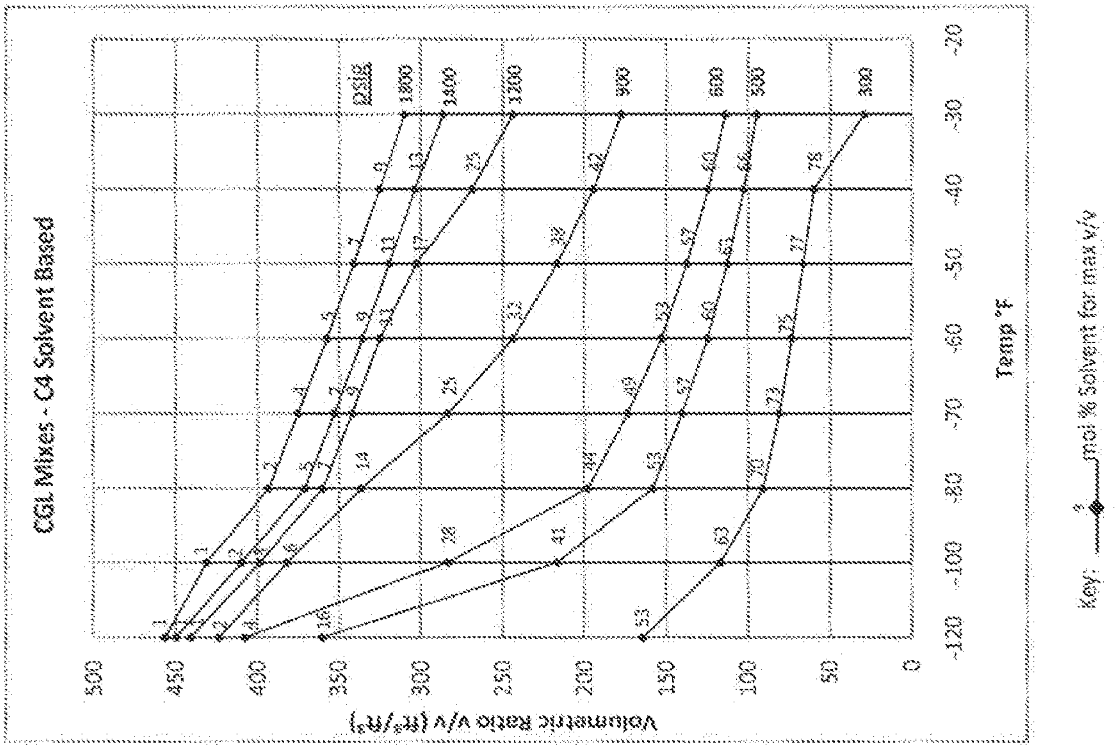
FIGS. 6A and 6B are graphs showing the volumetric ratio (v/v) of CNG and PLNG and the volumetric ratio of a natural gas component of a butane solvent-based CGL mixture at the same storage temperatures and pressures.

FIGS. 4A and B, 5A and B, 6A and B, 7A and B and 8A and B show the relative behavior of different solvent based CGL mixes. Ethane, propane and butane based CGL mixtures are first shown in FIGS. 4B, 5B, and 6B representing the behavior of the three fundamental solvents that underlie the enhanced density of the CGL technology. Two different propane and butane mixtures then form the solvents in FIGS. 7B and 8B and are representative of NGL and LPG based solvents that can be derived from the three fundamental constituents. The performance is shown as the V/V ratio for lines of constant pressure under various conditions of temperature. The CGL mixture curves have additional information for each temp/pressure point giving the required mol % of solvent required to yield maximum net V/V values for that particular storage point.

Figure 5A:
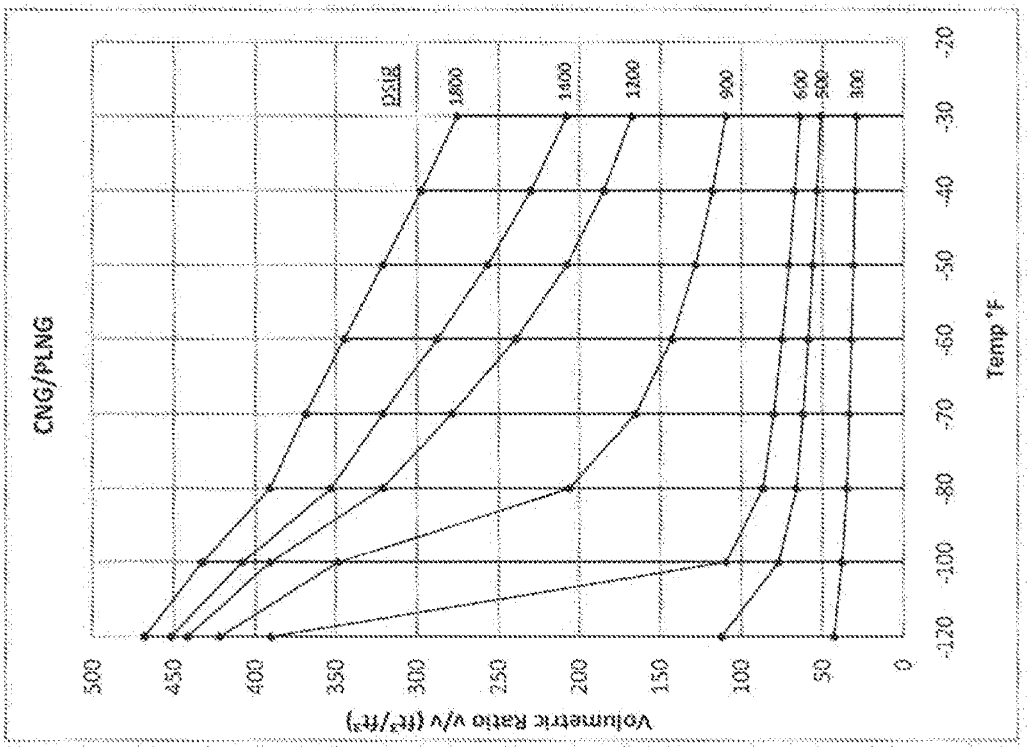

With reference to FIGS. 5A and B showing the mid range behavior of propane solvent based CGL product mixtures, the following observations are representative of the behavior of the remaining ethane, butane, and NGL and LPG solvent based CGL mixtures. A region of improved performance running directionally from the 500 psig, −120° F. storage point to the 1800 psig, −40° F. point shows improved V/V values for the CGL mix when compared to the CNG/PLNG case subject to the same storage conditions.

To achieve the best case performance of 300 to 400 volumetric ratio range, the percentage mol amount of solvent concentration in the CGL product mix rises from about 10% mol at low temperature and low pressure conditions to higher concentrations of 16 to 21% mol at mid range conditions, and then tapers to lower concentrations in the range of 8 to 13% at the highest temperature, highest pressure conditions. On either side of this region of improved performance there is a fall off in the gain of V/V for CGL storage relative to that for CNG and PLNG storage of straight natural gas. In higher pressure, lower temperature regions the storage densities of CGL storage approaches the storage densities of PLNG storage. The further away from this effective region, the lower the percentages of solvent are dictated for CGL storage to approach the V/V values of PLNG storage. Superior values of V/V for PLNG storage of straight natural gas in this region are commercially attractive, but are subject to a more energy intensive process than is required for CGL storage in areas of interest along the effective region.

CGL storage performance similarly tapers off as one moves away from the effective region to lower pressure higher temperature storage points. Here the achieved values of V/V are measured against the performance of CNG storage. To attain the best values of V/V, the requirement for a liquid state of the CGL product demands greater mol percentages of solvent be added to the CGL product mix as conditions move away from the region—a situation not so much suited to tight maritime limits on storage space, as it is to land based service such as peak shaving systems.

The increasing levels of solvent demanded in this area for CGL to outperform CNG places the technology against a law of diminishing returns relative for the available space for natural gas molecules to fit in the CGL product mix. Eventually the value of V/V for CGL storage abruptly falls off compared to that of CNG storage. The superior, but low values of V/V for CNG storage in this region have limited commercial attraction because of the low gas cargo mass to containment mass ratio.

As depicted in FIGS. 4A and B, the behavior of CGL product mixtures made from lighter ethane based solvents exhibit a similar region of improved performance relative to that of CGL product mixtures made from propane based solvents whereby the CGL storage V/V ratio under select conditions is higher than that of similarly stored straight natural gas using CNG or PLNG storage. FIGS. 4A and B show beneficial properties for ethane solvent based CGL product mixes at a high pressure of 1400 psig, −40° F., as compared to the 1800 psig at −40° F. outer position of propane solvent based CGL product mixes. The region again commences at the condition for 500 psig at −120° F., beneficial behavior rising and tapering away as conditions move towards the 1800 psig at −40° F. condition. As with propane solvent based CGL product mixes, there is a similar fall off in performance of V/V values for CGL storage relative to storage of straight natural gas used in CNG or PLNG systems that occurs as storage conditions trend toward regions above and below the effective region.

Figure 6A:
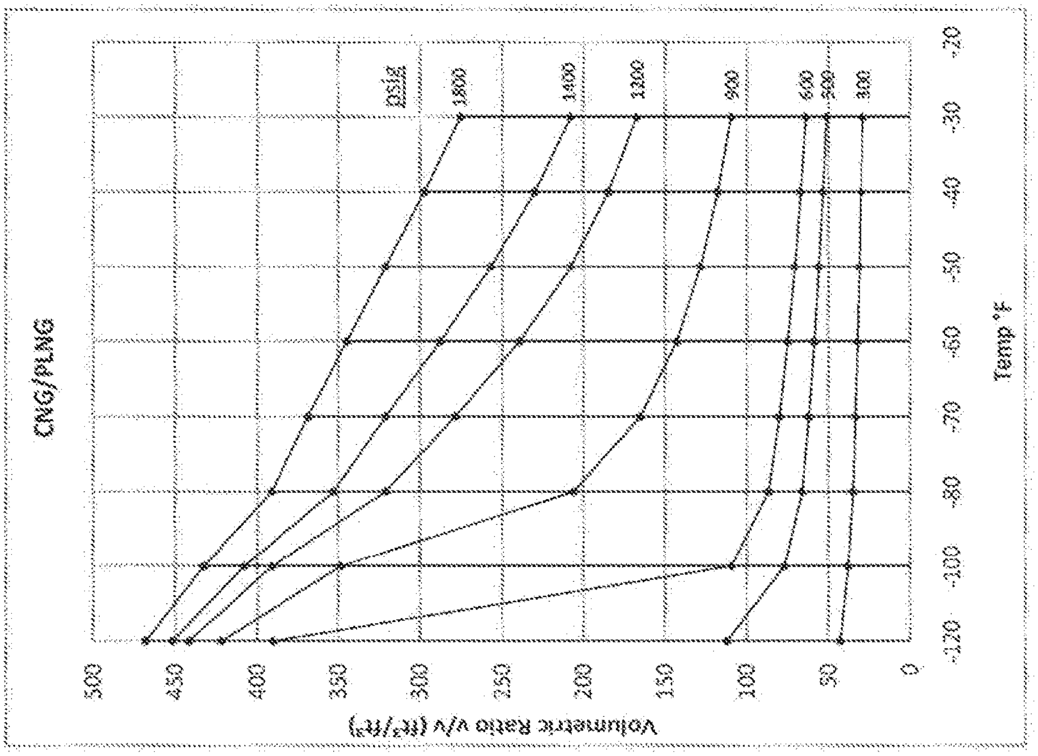

FIGS. 6A and B, 7A and B and 8A and B show beneficial properties for butane, NGL and LPG solvent based CGL product mixtures. A small shift in performance out towards points between 1800 psig at −30° F. and for 500 psig at −120° F. is noted relative to the cases for ethane and propane solvent based CGL product mixtures. Again, as per ethane and propane solvent based CGL product mixes, there is a similar fall off in performance of V/V figures for CGL storage relative to those of straight natural gas using CNG or PLNG systems in storage regions above and below the region.

Overall it is clear from FIGS. 4A through 8B that CGL storage outperforms PLNG and CNG storage in a region extending between 500 psig at −120° F. and 1600 to 1800 psig at −30° F. The preferred area of storage is approximately a linear array of pressure and temperature conditions forming a beneficial area between these two containment conditions. Higher V/V values are achievable with PLNG at the expense of higher unit energy consumption. Notwithstanding, values of volumetric ratio (V/V) can be reasonably obtained between 285 and 391 times that of straight natural gas at standard conditions. The higher V/V value of 391 occurs for a propane solvent based CGL product mix at 500 psig, −120° F. and exceeds the equivalent V/V value of 112 for CNG storage of straight natural gas by nearly a factor of 4. The lower V/V value of 267 occurs for an ethane solvent based CGL product mix at 1400 psig, −40° F. and exceeds the V/V value of 230 for CNG storage of straight natural gas by a factor of about 1.16.

Referring to FIG. 4B, the volumetric ratios of the natural gas component in a CGL product mix under various pressure and temperature conditions at various concentrations of ethane (C2) are depicted. For instance, the advantageous volumetric ratio of the natural gas component in an ethane solvent based CGL product mix under temperature conditions from less than −30° to about −120° F. with pressure ranging from about 300 psig to about 1400 psig is in the range of 248 to 357 at concentrations of ethane (C2) in the range of 9 to 43% mol. At a narrower pressure range, the advantageous volumetric ratio of the natural gas component in a CGL product mix under pressure conditions of about 300 psig to less than 900 psig with temperature conditions ranging from about −30° to about −120° F. is in the range of 274 to 387 at concentrations of ethane (C2) in the range of 9 to 43% mol. At a narrower pressure and temperature range, the advantageous volumetric ratio of the natural gas component in a CGL product mix under temperature and pressure conditions of less than −80° to about −120° F. and about 300 psig to less than 900 psig is in the range of 260 to 388 at concentrations of ethane (C2) in the range of 9 to 43% mol. At a more preferred pressure and temperature range, the advantageous volumetric ratio of the natural gas component in a CGL product mix under temperature and pressure conditions of less than −80° F. to about −120° F. and about 500 psig to less than 900 psig is in the range of 315 to 388 at concentrations of ethane (C2) in the range of 9 to 16% mol. As is readily apparent from FIGS. 4A and B, the volumetric ratio of the natural gas component of the CGL product mix exceeds the volumetric ratio of CNG and LNG for the same temperature and pressure within the ranges discussed above.

Referring to FIG. 5B, the volumetric ratios of the natural gas component in a CGL product mix under various pressure and temperature conditions at various concentrations of propane (C3) are depicted. For instance, the advantageous volumetric ratio of the natural gas component in a propane solvent based CGL product mix under temperature conditions from less than −30° F. to about −120° F. with pressure conditions ranging from about 300 psig to about 1800 psig is in the range of 282 to 392 at concentrations of propane (C3) in the range of 10 to 21% mol. At a narrower pressure range, the advantageous volumetric ratio of the natural gas component in a CGL product mix under pressure conditions of about 300 psig to less than 900 psig with temperature conditions ranging from about −30° to about −120° F. is in the range of 332 to 392 at concentrations of propane (C3) in the range of 10 to 21% mol. At a narrower pressure and temperature range, the advantageous volumetric ratio of the natural gas component in a CGL product mix under temperature and pressure conditions of less than −80° F. to about −120° F. and about 300 psig to less than 900 psig is in the range of 332 to 392 at concentrations of propane (C3) in the range of 10 to 21% mol. At a more preferred pressure and temperature range, the advantageous volumetric ratio of the natural gas component in a CGL product mix under temperature and pressure conditions of less than −80° to about −120° F. and about 500 psig to less than 900 psig is in the range of 332 to 392 at concentrations of propane (C3) in the range of 10 to 21% mol. As is readily apparent from FIGS. 5A and B, the volumetric ratio of the natural gas component of the CGL product mix exceeds the volumetric ratio of CNG and PLNG for the same temperature and pressure within the ranges discussed above.

Referring to FIG. 6B, the volumetric ratios of the natural gas component in a CGL product mix under various pressure and temperature conditions at various concentrations of butane (C4) are depicted. For instance, the advantageous volumetric ratio of the natural gas component in a butane solvent based CGL product mix under temperature conditions from less than −30° F. to about −120° F. with pressure conditions ranging from about 300 psig to about 1800 psig is in the range of 302 to 360 at concentrations of butane (C4) in the range of 9 to 28% mol. At a narrower pressure range, the advantageous volumetric ratio of the natural gas component in a CGL product mix under pressure conditions of about 300 psig to less than 900 psig with temperature conditions ranging from about −30° to about −120° F. is in the range of 283 to 359 at concentrations of butane (C4) in the range of 14 to 25% mol. At a narrower pressure and temperature range, the advantageous volumetric ratio of the natural gas component in a CGL product mix under temperature and pressure conditions of less than −80° to about −120° F. and about 300 psig to less than 900 psig is in the range of 283 to 359 at concentrations of butane (C4) in the range of 14 to 25% mol. At a more preferred pressure and temperature range, the advantageous volumetric ratio of the natural gas component in a CGL product mix under temperature and pressure conditions of less than −80° F. to about −120° F. and about 500 psig to less than 900 psig is in the range of 283 to 359 at concentrations of butane (C4) in the range of 14 to 25% mol. As is readily apparent from FIGS. 6A and B, the volumetric ratio of the natural gas component of the CGL product mix exceeds the volumetric ratio of CNG and PLNG for the same temperature and pressure within the ranges discussed above.

Figure 7B:
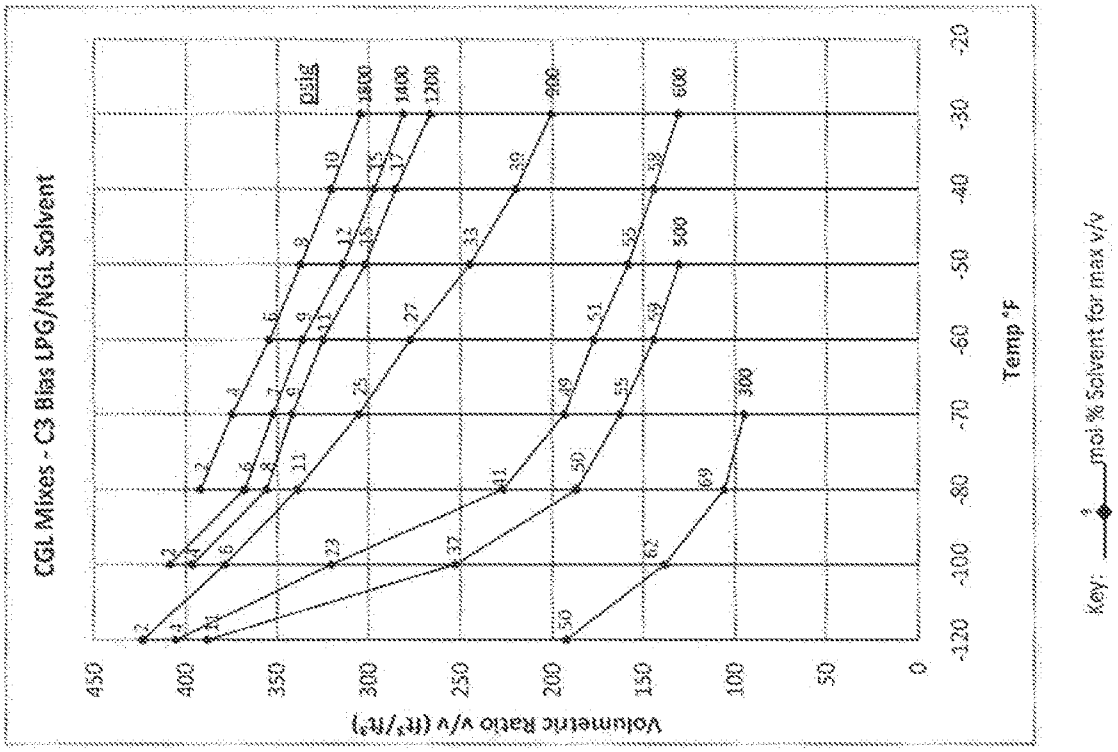
FIGS. 7A and 7B are graphs showing the volumetric ratio (v/v) of CNG and PLNG and the volumetric ratio of a natural gas component of a NGL/LPG solvent-based CGL mixture having a propane bias at the same storage temperatures and pressures.
Figure 7A:
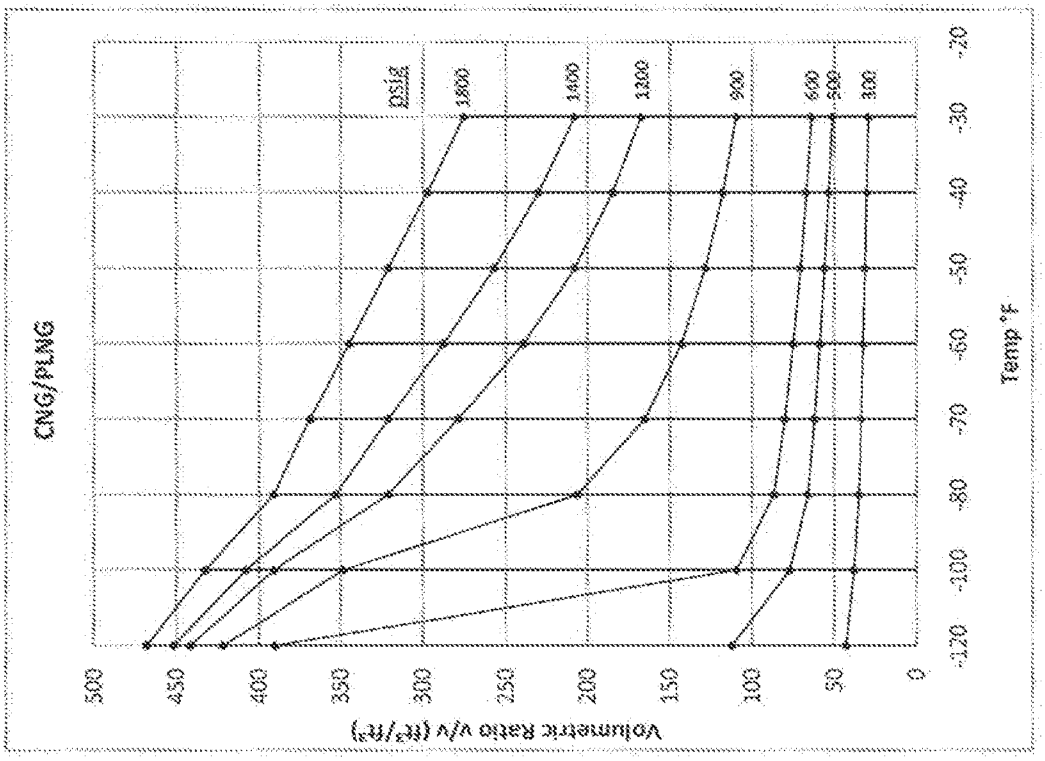

Referring to FIG. 7B, the volumetric ratios of the natural gas component in a CGL product mix under various pressure and temperature conditions at various concentrations of a natural gas liquid (NGL) solvent with a propane bias of 75% C3 to 25% C4 are depicted. For instance, the advantageous volumetric ratio of the natural gas component in a NGL with propane bias solvent based CGL product mix under temperature conditions from less than −30° F. to about −120° F. with pressure conditions ranging from about 300 psig to about 1800 psig is in the range of 281 to 388 at concentrations of the NGL solvent with propane bias in the range of 9 to 41% mol. At a narrower pressure range, the advantageous volumetric ratio of the natural gas component in a CGL product mix under pressure conditions of about 300 psig to less than 900 psig with temperature conditions ranging from about −30° F. to about −120° F. is in the range of 320 to 388 at concentrations of the NGL solvent with propane bias in the range of 9 to 41% mol. At a narrower pressure and temperature range, the advantageous volumetric ratio of the natural gas component in a CGL product mix under temperature and pressure conditions of less than −80° to about −120° F. and about 300 psig to less than 900 psig is in the range of 320 to 388 at concentrations of the NGL solvent with propane bias in the range of 9 to 41% mol. At a more preferred pressure and temperature range, the advantageous volumetric ratio of the natural gas component in a CGL product mix under temperature and pressure conditions of less than −80° to about −120° F. and about 500 psig to less than 900 psig is in the range of 320 to 388 at concentrations of the NGL solvent with propane bias in the range of 9 to 41% mol. As is readily apparent from FIGS. 7A and B, the volumetric ratio of the natural gas component of the CGL product mix exceeds the volumetric ratio of CNG and PLNG for the same temperature and pressure within the ranges discussed above.

Figure 8A:
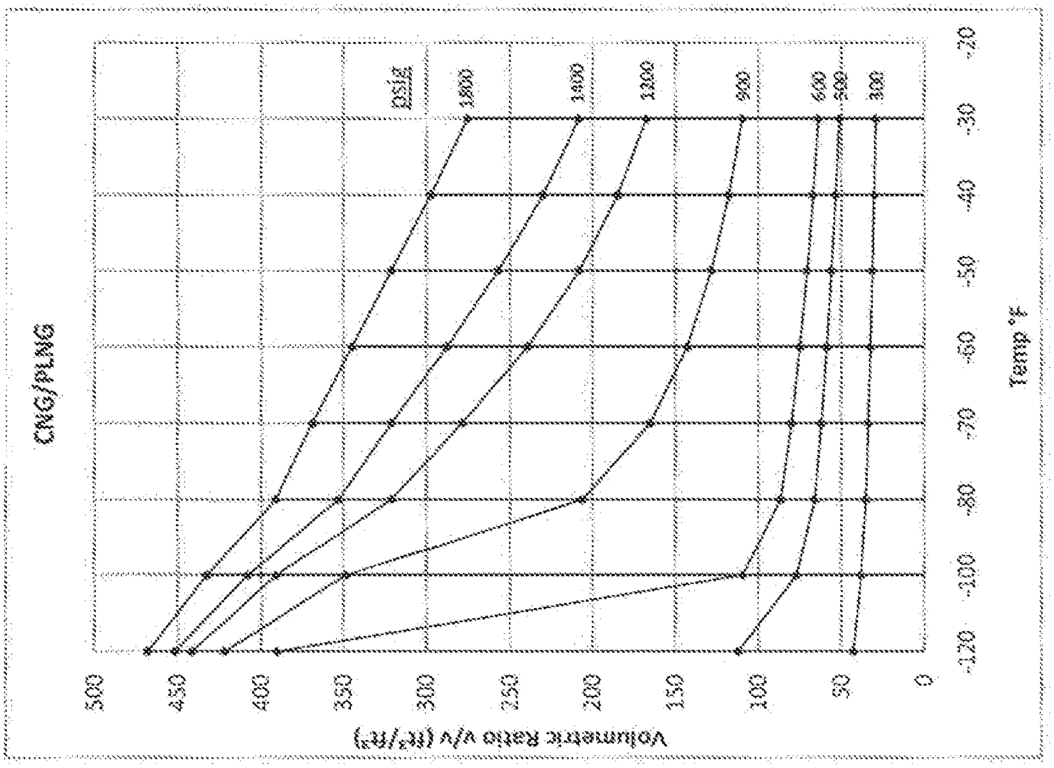
FIGS. 8A and 8B are graphs showing the volumetric ratio (v/v) of CNG and PLNG and the volumetric ratio V/V of a natural gas component of a NGL/LPG solvent-based CGL mixture having a butane bias at the same storage temperatures and pressures.
Figure 8B:
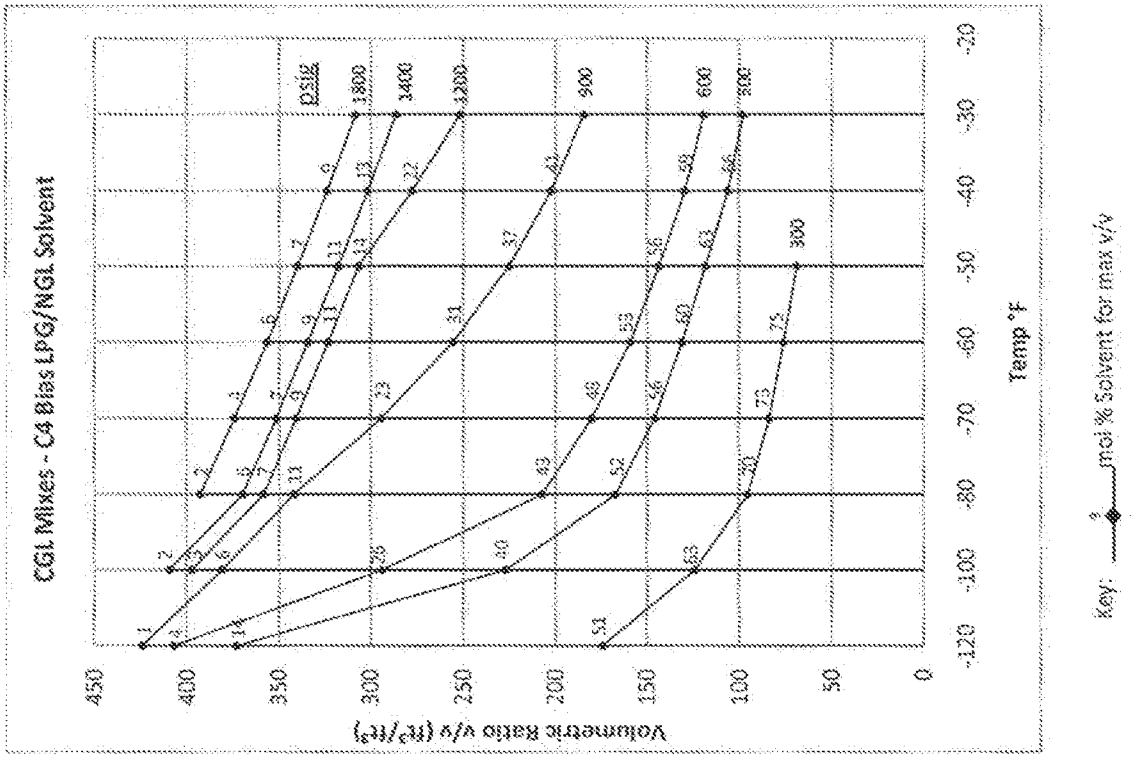

Referring to FIG. 8B, the volumetric ratios of the natural gas component in a CGL product mix under various pressure and temperature conditions at various concentrations of a NGL solvent with a butane bias of 75% C4 to 25% C3 are depicted. For instance, the advantageous volumetric ratio of the natural gas component in a NGL with butane bias solvent based CGL product mix under temperature conditions from less than −30° F. to about −120° F. with pressure conditions ranging from about 300 psig to about 1800 psig is in the range of 286 to 373 at concentrations of the NGL solvent with butane bias in the range of 9 to 26% mol. At a narrower pressure range, the advantageous volumetric ratio of the natural gas component in a CGL product mix under pressure conditions of about 300 psig to less than 900 psig with temperature conditions ranging from about −30° F. to about −120° F. is in the range of 294 to 373 at concentrations of the NGL solvent with butane bias in the range of 11 to 26% mol. At a narrower pressure and temperature range, the advantageous volumetric ratio of the natural gas component in a CGL product mix under temperature and pressure conditions of less than −80° to about −120° F. and about 300 psig to less than 900 psig is in the range of 294 to 373 at concentrations of the NGL solvent with butane bias in the range of 14 to 26% mol. At a more preferred pressure and temperature range, the advantageous volumetric ratio of the natural gas component in a CGL product mix under temperature and pressure conditions of less than −80° to about −120° F. and about 500 psig to less than 900 psig is in the range of 294 to 373 at concentrations of the NGL solvent with butane bias in the range of 14 to 26% mol. As is readily apparent from FIGS. 8A and B, the volumetric ratio of the natural gas component of the CGL product mix exceeds the volumetric ratio of CNG and PLNG for the same temperature and pressure within the ranges discussed above.

Other embodiments described below are directed to a total delivery system built around CGL production and containment and, more particularly, to systems and methods that utilize modularized storage and process equipment scaled and configured for floating service vessels, platforms, and transport vessels to yield a total solution to the specific needs of a supply chain, enabling rapid economic development of remote reserves to be realized by a means not afforded by liquid natural gas (LNG) or compressed natural gas (CNG) systems, in particular reserves at a land or sea location of a size deemed “stranded” or “remote” by the natural gas industry. The systems and methods described herein provide a full value chain to the reserve owner with one business model that covers the raw production gas processing, conditioning, transporting and delivering to market pipeline quality gas or fractionated products—unlike that of LNG and CNG.

Moreover, the special processes and equipment needed for CNG and LNG systems are not needed for a CGL based system. The operation specifications and construction layout of the containment system also advantageously enables the storage of straight ethane and NGL products in sectioned zones or holds of a vessel on occasions warranting mixed transport.

Figure 9:
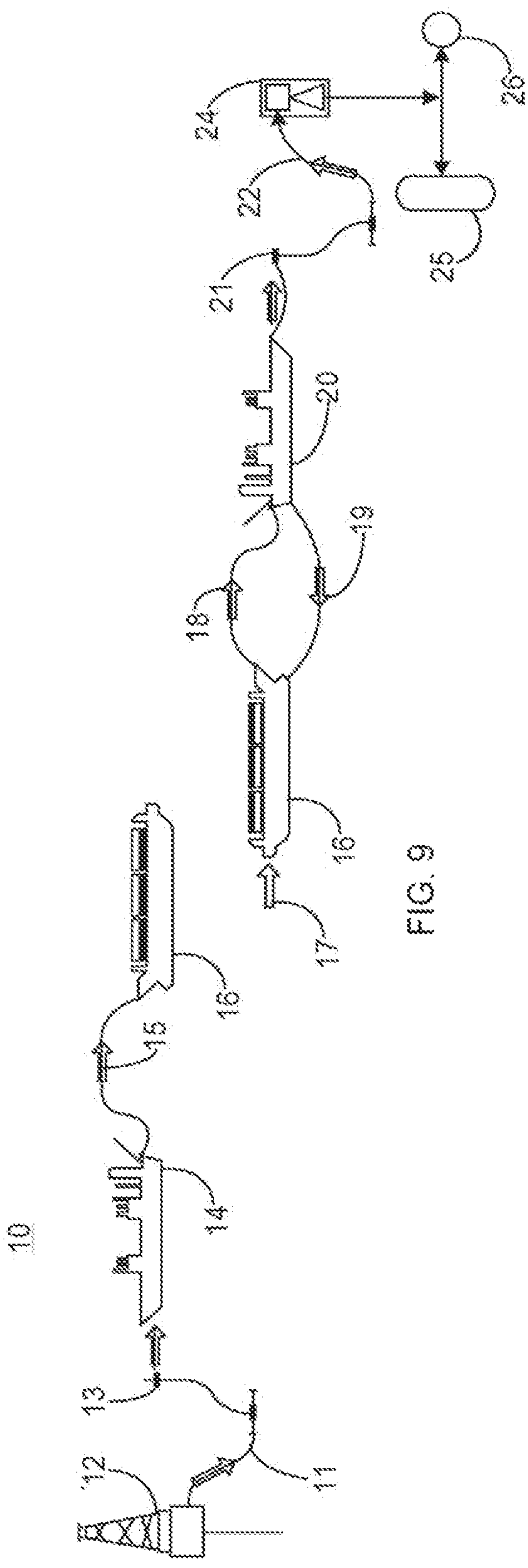
FIGS. 9 and 10 are schematic diagrams of CGL systems that enable raw production gas (including NGLs) to be loaded, processed, conditioned, transported (in liquid form) and delivered as pipeline quality natural gas or fractionated gas products to market.

In accordance with a preferred embodiment, as depicted in FIG. 9, the method of natural gas preparation, CGL product mixing, loading, storing and unloading is provided by process modules mounted on barges 14 and 20 operated at the gas field 12 and gas market 22 locations. For transportation 17 of the CGL product between the field 12 and market 22, a transportation vessel or CGL carrier 16 is preferably a purpose built vessel, a converted vessel or an articulated or standard barge selected according to market logistics of demand and distance, as well as environmental operational conditions.

To contain the CGL cargo, the containment system preferably comprises a carbon steel, pipeline-specification, tubular network nested in place within a chilled environment carried on the vessel. The pipe essentially forms a continuous series of parallel serpentine loops, sectioned by valves and manifolds.

The vessel layout is typically divided into one or more insulated and covered cargo holds, containing modular racked frames, each carrying bundles of nested storage pipe that are connected end-to-end to form a single continuous pipeline. Enclosing the containment system located in the cargo hold allows the circulation of a chilled nitrogen stream or blanket to maintain the cargo at its desired storage temperature throughout the voyage. This nitrogen also provides an inert buffer zone which can be monitored for CGL product leaks from the containment system. In the event of a leak, the manifold connections are arranged such that any leaking pipe string or bundle can be sectioned, isolated and vented to emergency flare and subsequently purged with nitrogen without blowing down the complete hold.

At the delivery point or market location, the CGL product is completely unloaded from the containment system using a displacement fluid, which unlike LNG and most CNG systems does not leave a "heel" or "boot" quantity of gas behind. The unloaded CGL product is then reduced in pressure outside of the containment system in low temperature process equipment where the start of the fractionation of the natural gas constituents begins. The process of separation of the light hydrocarbon liquid is accomplished using a standard fractionation train, preferably with individual rectifier and stripper sections in consideration of marine stability.

Compact modular membrane separators can also be used in the extraction of solvent from the CGL. This separation process frees the natural gas and enables it to be conditioned to market specifications while recovering the solvent fluid.

Trim control of minor light hydrocarbon components, such as ethane, propane and butane for BTU and Wobbe Index requirements, yields a market specification natural gas mixture for direct offloading to a buoy connected with shore storage and transmission facilities.

The hydrocarbon solvent is returned to vessel storage and any excess C2, C3, C4 and C5+ components following market tuning of the natural gas can be offloaded separately as fractionated products or value added feedstock supply credited to the account of the shipper.

For ethane and NGL transportation, or partial load transportation, sectioning of the containment piping also allows a portion of the cargo space to be utilized for dedicated NGL transport or to be isolated for partial loading of containment system or ballast loading. Critical temperatures and properties of ethane, propane and butane permit liquid phase loading, storage and unloading of these products utilizing allocated CGL containment components. Vessels, barges and buoys can be readily customized with interconnected common or specific modular process equipment to meet this purpose. The availability of de-propanizer and de-butanizer modules on board vessels, or offloading facilities permits delivery with a process option if market specifications demand upgraded product.

As depicted in FIG. 9, in a CGL system 10 the natural gas from a field source 12 is preferably transmitted through a subsea pipeline 11 to a subsea collector 13 and then loaded on a barge 14 equipped for CGL product production and storage. The CGL product is then loaded 15 onto a CGL carrier 16 for marine transportation 17 to a market destination where it is unloaded 18 to a second barge 20 equipped for CGL product separation. Once separated, the CGL solvent is returned 19 to the CGL carrier 16 and the natural gas is offloaded to an offloading buoy 21, and then passes through a subsea pipeline 22 to shore where it is compressed 24 and injected into the gas transmission pipeline system 26, and/or on-shore storage 25 if required.

The barges 14 equipped for production and storage and the barges 20 equipped for separation can conveniently be relocated to different natural gas sources and gas market destinations as determined by contract, market and field conditions. The configuration of the barges 14 and 20, having a modular assembly, can accordingly be outfitted as required to suit route, field, market or contract conditions.

Figure 10:
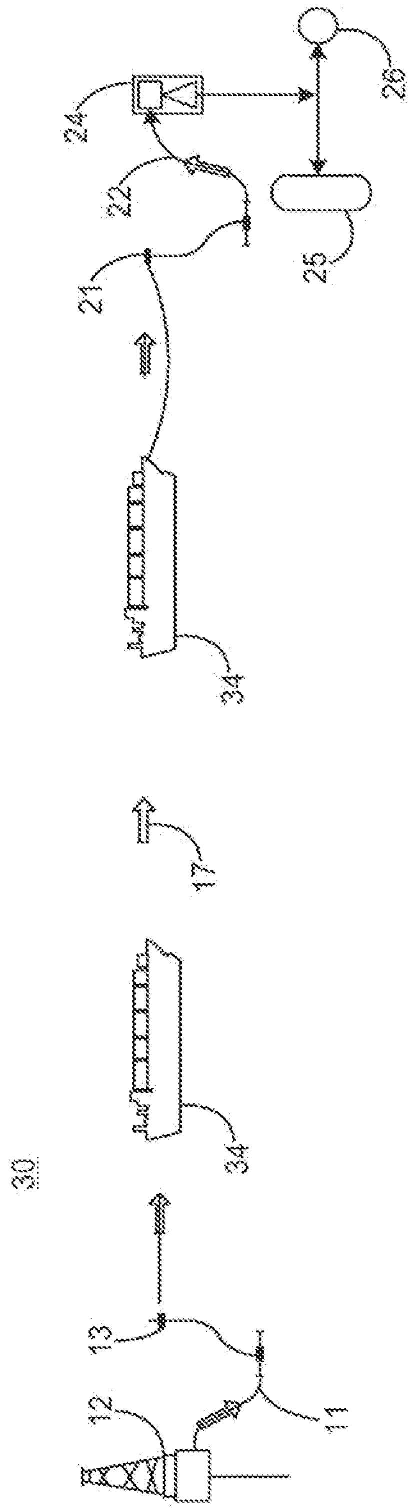

In an alternative embodiment, as depicted in FIG. 10, the CGL system 30 includes integral CGL carriers (CGLC) 34 equipped for on board raw gas conditioning, processing and CGL product production, storage, transportation and separation, as described in U.S. Pat. No. 7,517,391, entitled "Method Of Bulk Transport And Storage Of Gas In A Liquid Medium", which is incorporated herein by reference.

As illustrated in Table 1 below, the natural gas cargo density and containment mass ratios achievable in a CGL system surpass those achievable in a CNG system. Table 1 provides comparable performance values for storage of natural gas applicable to the embodiments described herein and the CNG system typified by the work of Bishop, U.S. Pat. No. 6,655,155, for qualified gas mixes. The data is given in all cases for similar containment material of low temperature carbon steel suited for service at the temperatures shown.

TABLE 1

| System & Design Code | CGL 1 CSA Z662-O3 | CGL 2 DNV Limit State | CNG 1 ASME B31.8 | CNG 2 ASME B31.8 |
|---|---|---|---|---|
| Storage Mix SG | 0.7 | 0.7 | 0.7 | 0.6 |
| Pressure (psig) | 1400 | 1400 | 1400 | 1400 |
| Temperature (° F.) | −40 | −40 | −30 | −20 |
| Natural Gas Density (lb/ft3) | 12.848 (net) | 12.848 (net) | 9.200 (net) 17.276 (gross) | 11.98 |

TABLE 1-continued

| System & Design Code | CGL 1 CSA Z662-O3 | CGL 2 DNV Limit State | CNG 1 ASME B31.8 | CNG 2 ASME B31.8 |
|---|---|---|---|---|
| Containment Pipe O.D. (inch) | 42 | 42 | 42 | 42 |
| Gas Mass/ft pipe length (lb) | 115.81 | 117.24 | 81.75 (net) 153.46 (gross) | 103.2 |
| Pipe Mass/ft pipe length (lb) | 297.40 | 243.41 | 361.58 | 491.11 |
| Cargo-to-Containment Mass Ratio | 0.39 lb/lb (net) | 0.48 lb/lb (net) | 0.22 lb/lb (net) 0.42 lb/lb (gross) | 0.21 lb/lb |

The specific gravity (SG) value for the mixtures shown in Table 1 is not a restrictive value for CGL product mixtures. It is given here as a realistic comparative level to relate natural gas storage densities for CGL based systems performance to that of the best large commercial scale natural gas storage densities attained by the patented CNG technology described in Bishop.

The CNG 1 values, along with those for CGL 1 and CGL 2 are also shown as "net" values for the 0.6 SG natural gas component contained within the 0.7 SG mixtures to compare operational performances with that of a straight CNG case illustrated as CNG 2. The 0.7 SG mixes shown in Table 1 contain an equivalent propane constituent of 14.5 mol percent. The likelihood of finding this 0.7 SG mixture in nature is infrequent for the CNG 1 transport system and would therefore require that the natural gas mix be spiked with a heavier light hydrocarbon to obtain the dense phase mixture used for CNG as proposed by Bishop. The CGL process, on the other hand and without restriction, deliberately produces a product used in this illustration of 0.7 SG range for transport containment.

The cargo mass-to-containment mass ratio values shown for CGL 1, CGL 2, and CNG 2 system are all values for market specification natural gas carried by each system. For purposes of comparison of the containment mass ratio of all technologies delivering market specification natural gas component gas, the "net" component of the CNG 1 stored mixture is derived. It is clear that the CNG systems, limited to the gaseous phase and associated pressure vessel design codes, are not able to attain the cargo mass-to-containment mass ratio (natural gas to steel) performance levels that the embodiments described herein achieve using CGL product (liquid phase) to deliver market specification natural gas.

Table 2 below illustrates containment conditions of CGL product where a variation in solvent ratio to suit select storage pressures and temperatures yields an improvement of storage densities. Through the use of more moderate pressures at lower temperatures than previously discussed, and applying the applicable design codes, reduced values of wall thickness from those shown in Table 1 can be obtained. Values for the mass ratio of gas-to-steel for CGL product of over 3.5 times the values for CNG quoted earlier are thereby achievable.

TABLE 2

Mass Ratio at Select Containment Conditions of CGL (lb gas/lb steel)

| TEMPERATURE | −80 F. | −70 F. | −60 F. | −50 F. | −40 F. |
|---|---|---|---|---|---|
| Pressure | 0.749 | 0.702 | | | |
| 900 psig | 12 15.598 | 16 14.617 | | | |
| 1000 psig | 0.684 | 0.643 | 0.607 | | |
| | 10 15.878 | 14 14.944 | 18 14.103 | | |
| 1100 psig | | 0.594 | 0.559 | | |
| | | 12 15.224 | 14 14.337 | | |
| 1200 psig | | 0.552 | 0.522 | 0.492 | |
| | | 10 15.504 | 14 14.664 | 18 13.823 | |
| 1300 psig | | | 0.490 | 0.462 | 0.436 |
| | | | 12 14.944 | 14 14.103 | 18 13.31 |
| 1400 psig | | | | 0.436 | 0.411 |
| | | | | 14 14.384 | 18 13.543 |

Key: (Design to CSA Z662-03)

| Mgas/Msteel (lb/lb) | |
|---|---|
| % Solvent (% mol) | Gas Density (lb/ft3) |

The natural gas cargo density and containment mass ratios achievable in a CGL system are improved upon by storing the CGL product under temperature conditions from less than −80° to about −120° F. with pressure conditions ranging from about 300 psig to about 1800 psig, and under enhanced pressure conditions ranging from about 300 psig to less than 900 psig, and, more preferably, under enhanced pressure conditions ranging from about 500 psig to less than 900 psig.

Referring to FIGS. 11A-FIG. 15B, the containment mass ratios (M/M) of the natural gas component in a CGL product mixture under various storage conditions, optimal concentrations of solvent are depicted alongside the values attainable with straight natural gas in the form of CNG/PLNG. Under the codes used for development of both systems, the design factors also take into account the phase of the stored medium. This results in less, even plots of the graphic line patterns when compared alongside the corresponding volumetric ratio (V/V) line patterns of FIGS. 4A to 8B.

Line plots of M/M values are further displaced on account of code requirements for material specification changes as temperatures decrease. The containment material is preferably high strength low temperature carbon steel suited to temperature conditions down to −55° F. At lower temperatures the material specification changes to lower strength stainless or nickel steels. Given the design requirement for greater wall thickness values for lower strength materials used in pressure containment systems there is an attendant step down in the M/M value as expected for both CGL and CNG/PLNG cases examined here. How these values recover as temperatures further decrease is illustrated in these figures. A different behavior will be expected of a continuously used composite containment throughout the temperature band.

Figure 11A:
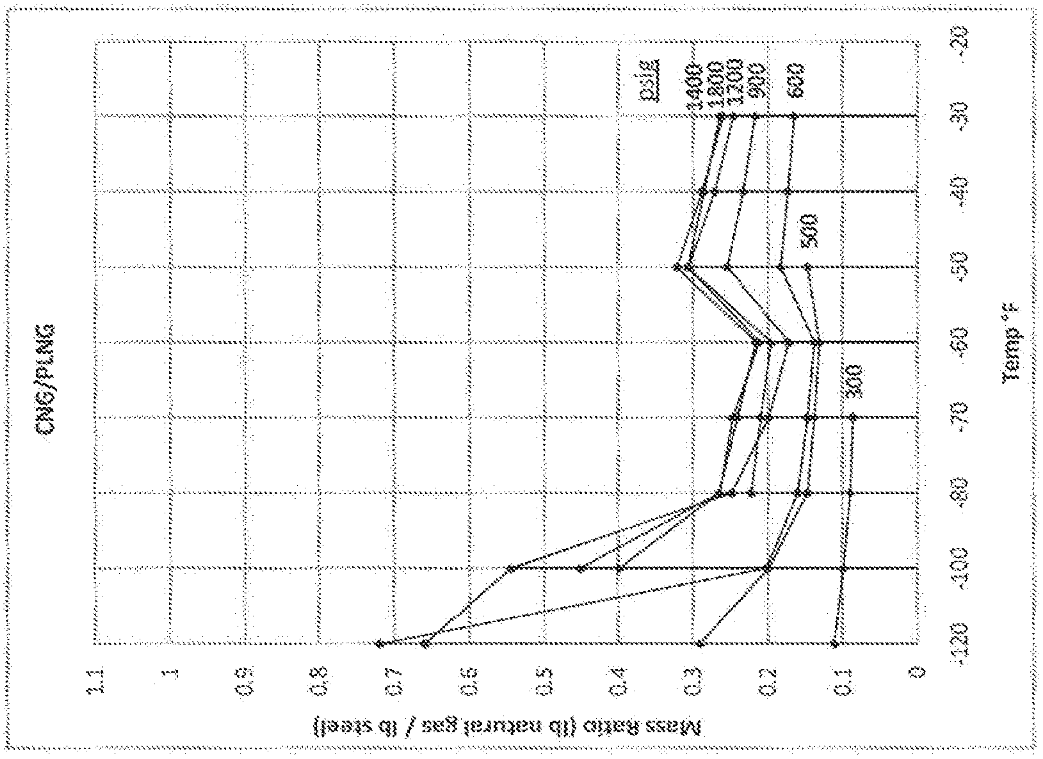
FIGS. 11A and 11B are graphs showing the mass ratio (m/m) of CNG and PLNG and the mass ratio of a natural gas component of an ethane solvent-based CGL mixture to the containment medium at the same storage temperatures and pressures.
Figure 11B:
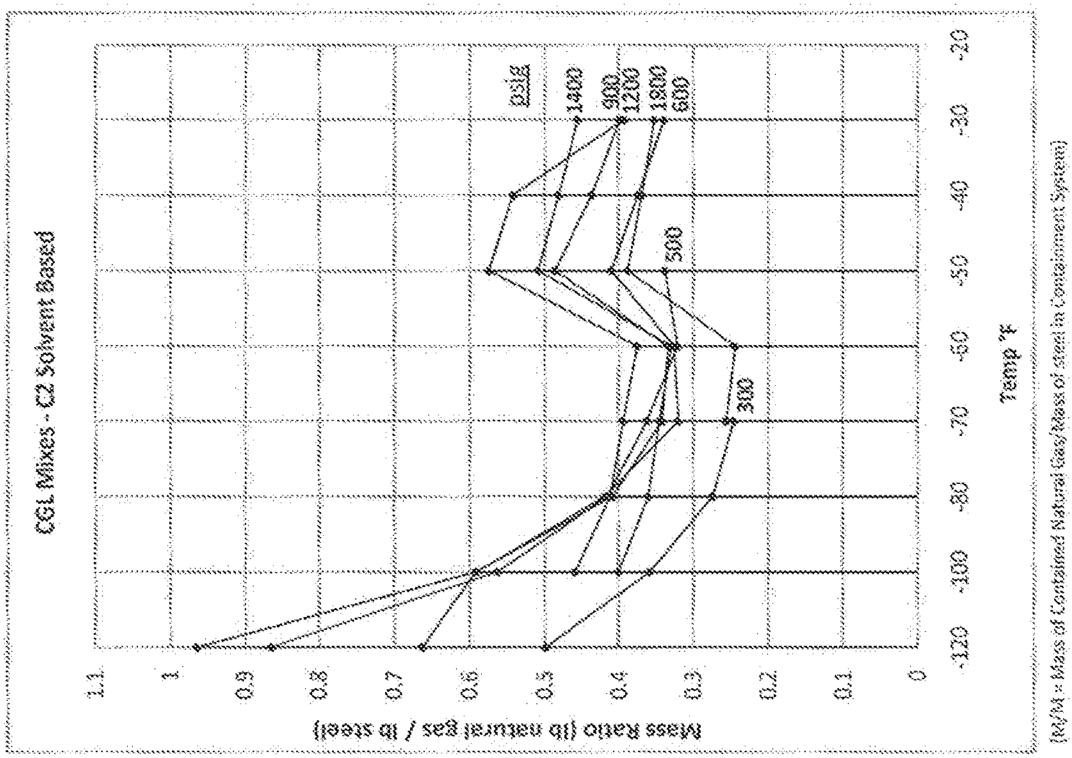

For instance, in FIG. 11B, the containment mass ratios of the natural gas component in a CGL product mix under various pressure conditions and temperature at optimal concentrations of an ethane based solvent, which concentrations are the same as the concentration in FIG. 4B, are depicted. For instance, the containment mass ratio of the natural gas component in a CGL product mix, under pressure conditions ranging from about 300 psig to about 1800 psig and with temperature conditions from less than −80° F. to about −120° F., is in the range of 0.27 to 0.97 lb/lb. For the same storage conditions, as shown in FIG. 11A, CNG/PLNG storage here yields a range of 0.09 to 0.72 lb/lb. The containment mass ratio of the natural gas component in a CGL product mix, under pressure conditions ranging from about 300 psig to less than 900 psig with temperature conditions from −30° F. to about −120° F., is in the range of 0.25 to 0.97 lb/lb. For the same storage conditions, CNG/PLNG storage yields a range of 0.09 to 0.72 lb/lb. The containment mass ratio of the natural gas component in a CGL product mix, under pressure conditions of about 300 psig to less than 900 psig with temperature conditions of less than −80° F. to about −120° F., is in the range of 0.28 to 0.97 lb/lb. For the same storage conditions, CNG/PLNG storage yields a range of 0.09 to 0.72 lb/lb. More preferably, the containment mass ratio of the natural gas component in a CGL product mix under pressure conditions of about 500 psig to less than 900 psig and temperature conditions of less than −80° to about −120° F. is in the range of 0.41 to 0.97 lb/lb. For the same storage conditions, CNG/PLNG storage yields a range of 0.13 to 0.72 lb/lb. As is readily apparent from FIGS. 11A and B, the containment mass ratio of the natural gas component of the CGL product mix exceeds the containment mass ratio of CNG and LNG for the same temperature and pressure within the ranges discussed above.

Figure 12B:
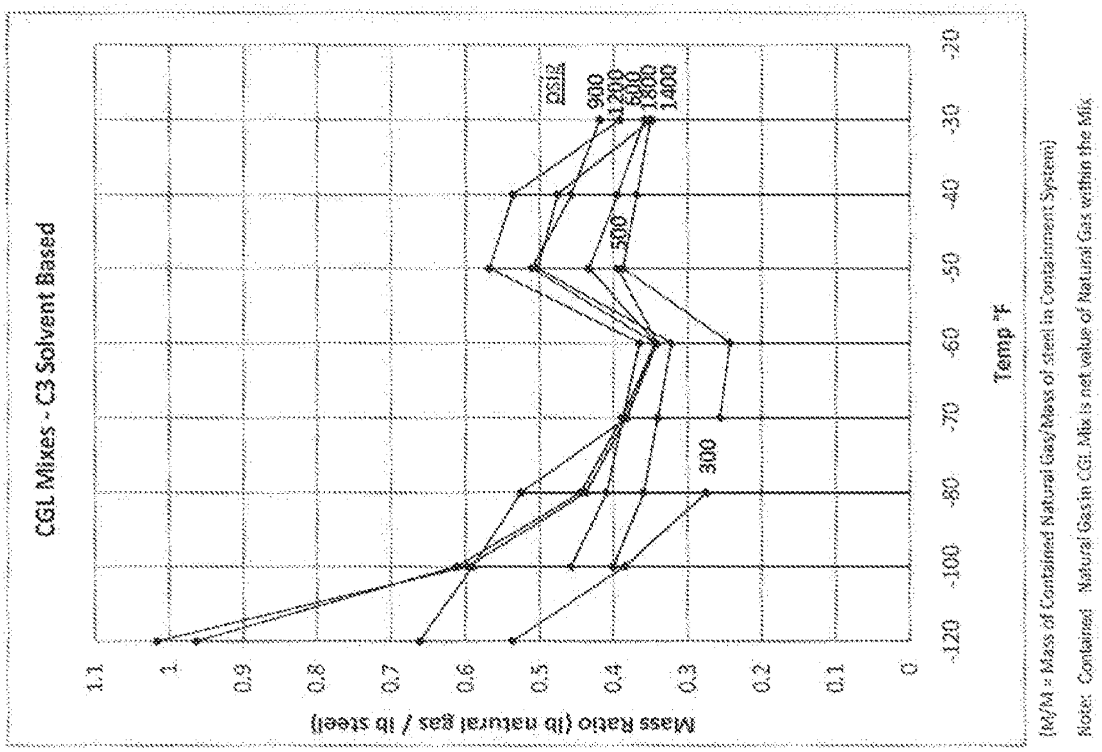
FIGS. 12A and 12B are graphs showing the mass ratio (m/m) of CNG and PLNG and the mass ratio of a natural gas component of a C3 solvent-based CGL mixture to the containment medium at the same storage temperatures and pressures.
Figure 12A:
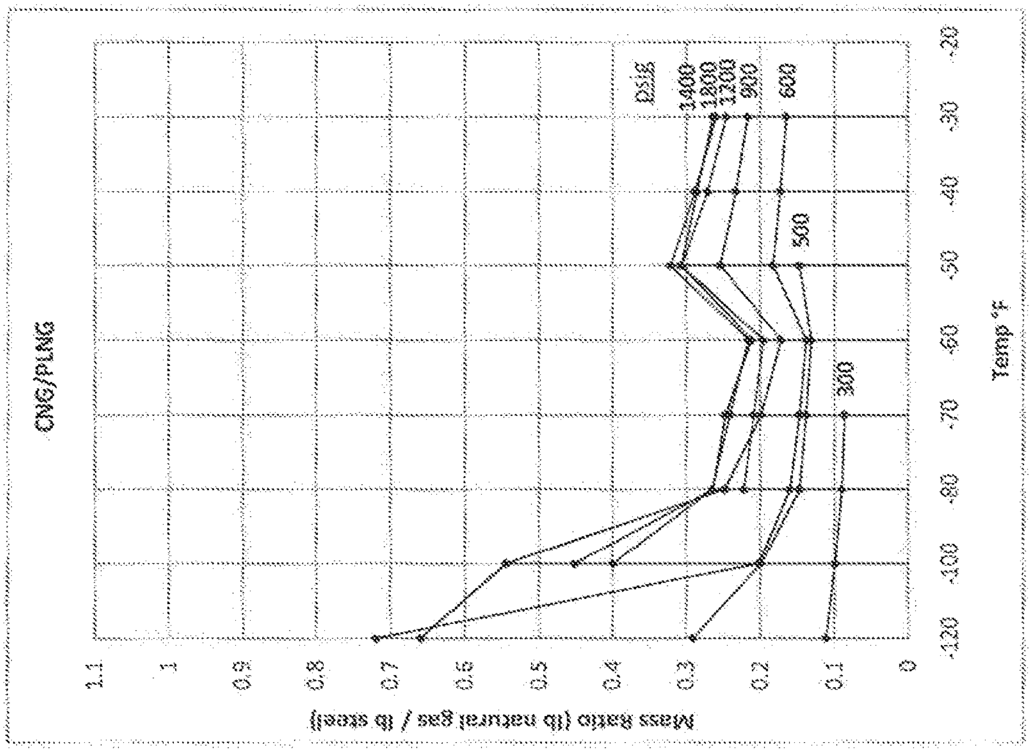

Referring to FIG. 12B, the containment mass ratios of the natural gas component in a CGL product mix under various pressure conditions and temperature at optimal concentrations of a propane based solvent, which concentrations are the same as the concentration in FIG. 5B, are depicted. For instance, the containment mass ratio of the natural gas component in a CGL product mix, under pressure conditions ranging from about 300 psig to about 1800 psig and with temperature conditions from less than −80° F. to about −120° F., is in the range of 0.27 to 1.02 lb/lb. For the same storage conditions, as shown in FIG. 12A, CNG/PLNG storage yields a range of 0.09 to 0.72 lb/lb. The containment mass ratio of the natural gas component in a CGL product mix, under pressure conditions ranging from about 300 psig to less than 900 psig with temperature conditions from −30° F. to about −120° F., is in the range of 0.27 to 1.02 lb/lb. For the same storage conditions, CNG/PLNG storage yields a range of 0.09 to 0.72 lb/lb. The containment mass ratio of the natural gas component in a CGL product mix, under pressure conditions of about 300 psig to less than 900 psig with temperature conditions of less than −80° F. to about −120° F., is in the range of 0.27 to 1.02 lb/lb. For the same storage conditions, CNG/PLNG storage yields a range of 0.09 to 0.72 lb/lb. More preferably, the containment mass ratio of the natural gas component in a CGL product mix under pressure conditions of about 500 psig to less than 900 psig and temperature conditions of less than −80° to about −120° F. is in the range of 0.44 to 1.02 lb/lb. For the same storage conditions, CNG/PLNG storage yields a range of 0.13 to 0.72 lb/lb. As is readily apparent from FIGS. 12A and B, the containment mass ratio of the natural gas component of the CGL product mix exceeds the containment mass ratio of CNG and LNG for the same temperature and pressure within the ranges discussed above.

Figure 13B:
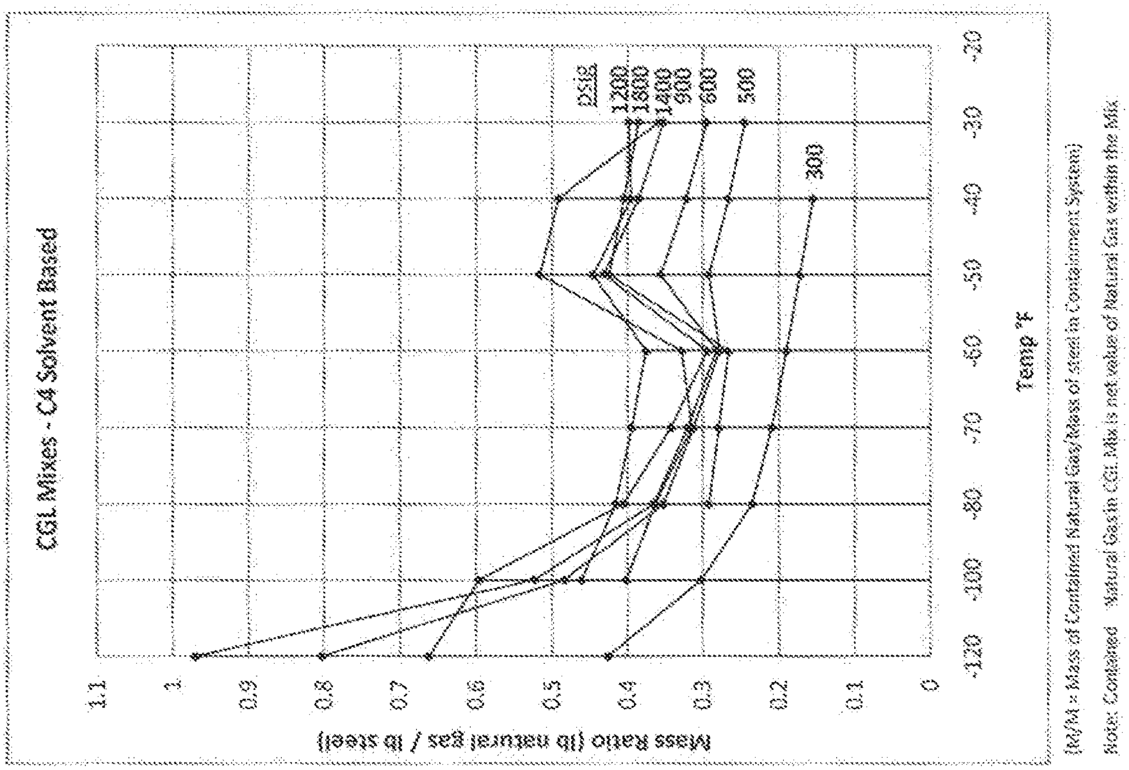
FIGS. 13A and 13B are graphs showing the mass ratio (m/m) of CNG and PLNG and the mass ratio of a natural gas component of a C4 solvent-based CGL mixture to the containment medium at the same storage temperatures and pressures.
Figure 13A:
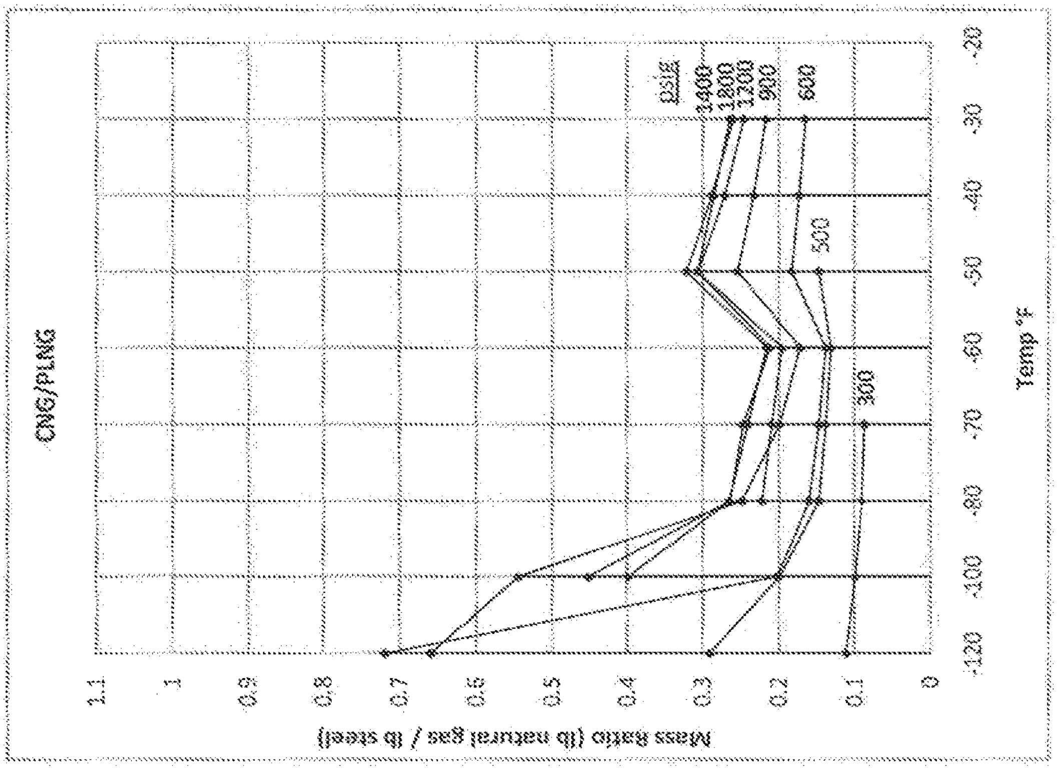

Referring to FIG. 13B, the containment mass ratios of the natural gas component in a CGL product mix under various pressure conditions and temperature at optimal concentrations of a butane based solvent, which concentrations are the same as the concentration in FIG. 6B, are depicted. For instance, the containment mass ratio of the natural gas component in a CGL product mix, under pressure conditions ranging from about 300 psig to about 1800 psig and with temperature conditions from less than −80° F. to about −120° F., is in the range of 0.24 to 0.97 lb/lb. For the same storage conditions, as shown in FIG. 13A, CNG/PLNG storage yields a range of 0.09 to 0.72 lb/lb. The containment mass ratio of the natural gas component in a CGL product mix, under pressure conditions ranging from about 300 psig to less than 900 psig with temperature conditions from −30° F. to about −120° F., is in the range of 0.18 to 0.97 lb/lb. For the same storage conditions, CNG/PLNG storage yields a range of 0.09 to 0.72 lb/lb. The containment mass ratio of the natural gas component in a CGL product mix, under pressure conditions of about 300 psig to less than 900 psig with temperature conditions of less than −80° F. to about −120° F., is in the range of 0.25 to 0.97 lb/lb. For the same storage conditions, CNG/PLNG storage yields a range of 0.09 to 0.25 lb/lb. More preferably, the containment mass ratio of the natural gas component in a CGL product mix under pressure conditions of about 500 psig to less than 900 psig and temperature conditions of less than −80° to about −120° F. is in the range of 0.35 to 0.97 lb/lb. For the same storage conditions, CNG/PLNG storage here yields a range of 0.13 to 0.72 lb/lb. As is readily apparent from FIG. 13, the containment mass ratio of the natural gas component of the CGL product mix exceeds the containment mass ratio of CNG and LNG for the same temperature and pressure within the ranges discussed above.

Figure 14A:
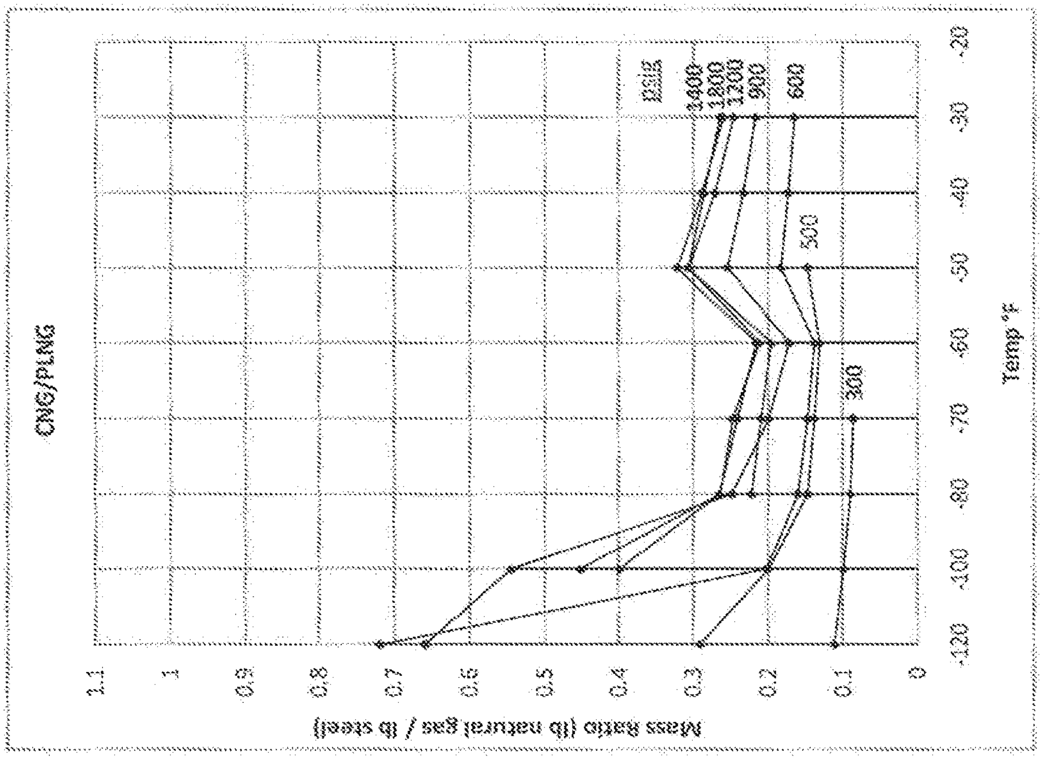
FIGS. 14A and 14B are graphs showing the mass ratio (m/m) of CNG and PLNG and the mass ratio of a natural gas component of a NGL solvent-based CGL mixture having a propane bias to the containment medium at the same storage temperatures and pressures.
Figure 14B:
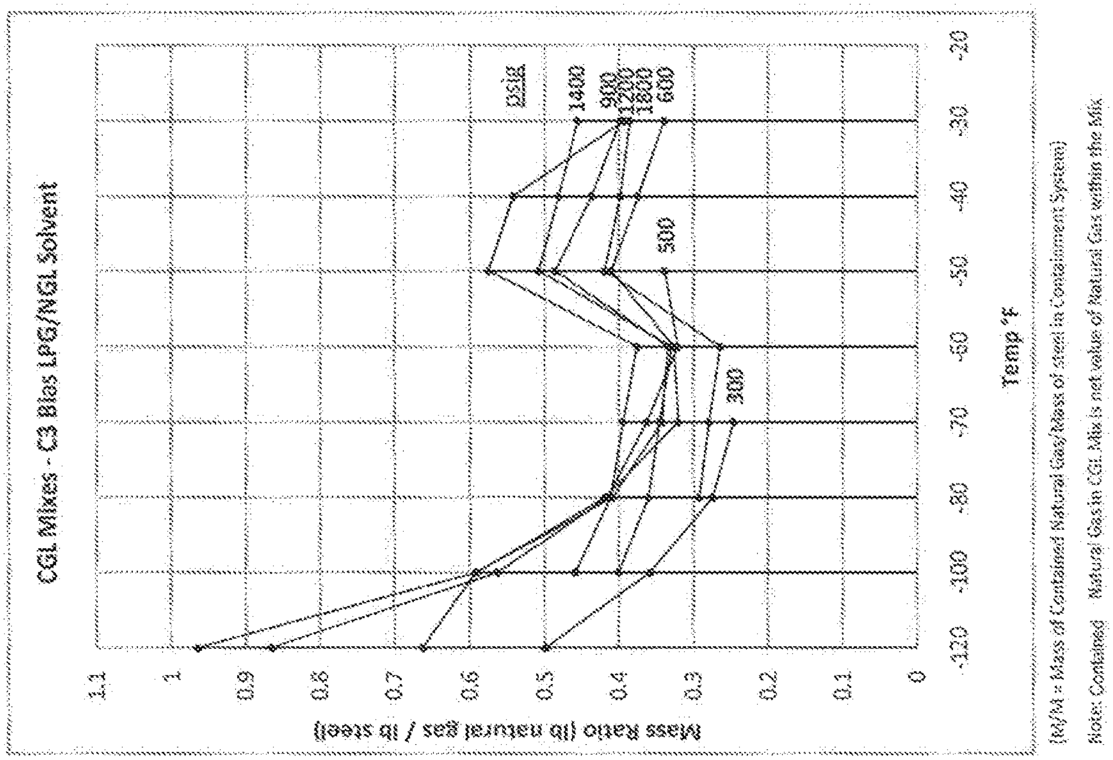

Referring to FIG. 14B, the containment mass ratios of the natural gas component in a CGL product mix under various pressure conditions and temperature at optimal concentrations of a NGL/LPG solvent with a propane bias of 75% C3 to 25% C4, which concentrations are the same as the concentration in FIG. 7B, are depicted. For instance, the containment mass ratio of the natural gas component in a CGL product mix, under pressure conditions ranging from about 300 psig to about 1800 psig and with temperature conditions from less than −80° F. to about −120° F., is in the range of 0.27 to 0.96 lb/lb. For the same storage conditions, as shown in FIG. 14A, CNG/PLNG storage here yields a range of 0.09 to 0.72 lb/lb. The containment mass ratio of the natural gas component in a CGL product mix, under pressure conditions ranging from about 300 psig to less than 900 psig with temperature conditions from −30° F. to about −120° F., is in the range of 0.27 to 0.96 lb/lb. For the same storage conditions, CNG/PLNG storage here yields a range of 0.09 to 0.72 lb/lb. The containment mass ratio of the natural gas component in a CGL product mix, under pressure conditions of about 300 psig to less than 900 psig with temperature conditions of less than −80° F. to about −120° F., is in the range of 0.25 to 0.96 lb/lb. For the same storage conditions, CNG/PLNG storage here yields a range of 0.09 to 0.25 lb/lb. More preferably, the containment mass ratio of the natural gas component in a CGL product mix under pressure conditions of about 500 psig to less than 900 psig and temperature conditions of less than −80° to about −120° F. is in the range of 0.42 to 0.96 lb/lb. For the same storage conditions, CNG/PLNG storage here yields a range of 0.13 to 0.72 lb/lb. As is readily apparent from FIGS. 14A and B, the containment mass ratio of the natural gas component of the CGL product mix exceeds the containment mass ratio of CNG and LNG for the same temperature and pressure within the ranges discussed above.

Figure 15B:
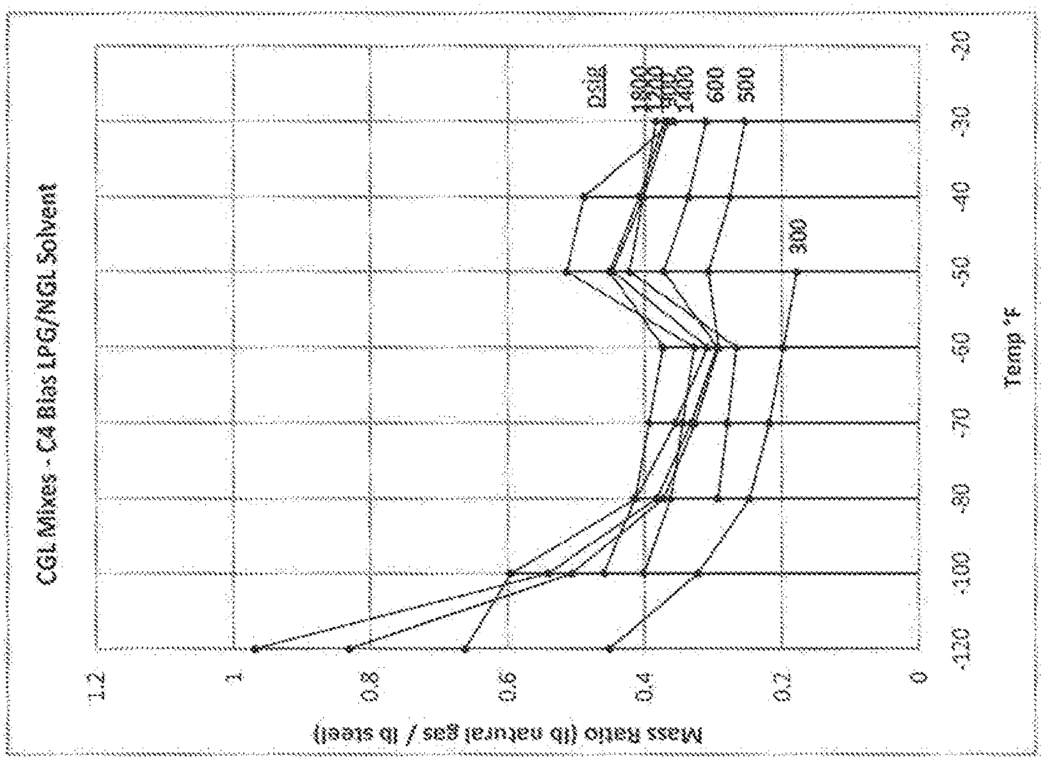
FIGS. 15A and 15B are graphs showing the mass ratio (m/m) of CNG and PLNG and the mass ratio of a natural gas component of a NGL solvent-based CGL mixture having a butane bias to the containment medium at the same storage temperatures and pressures.
Figure 15A:
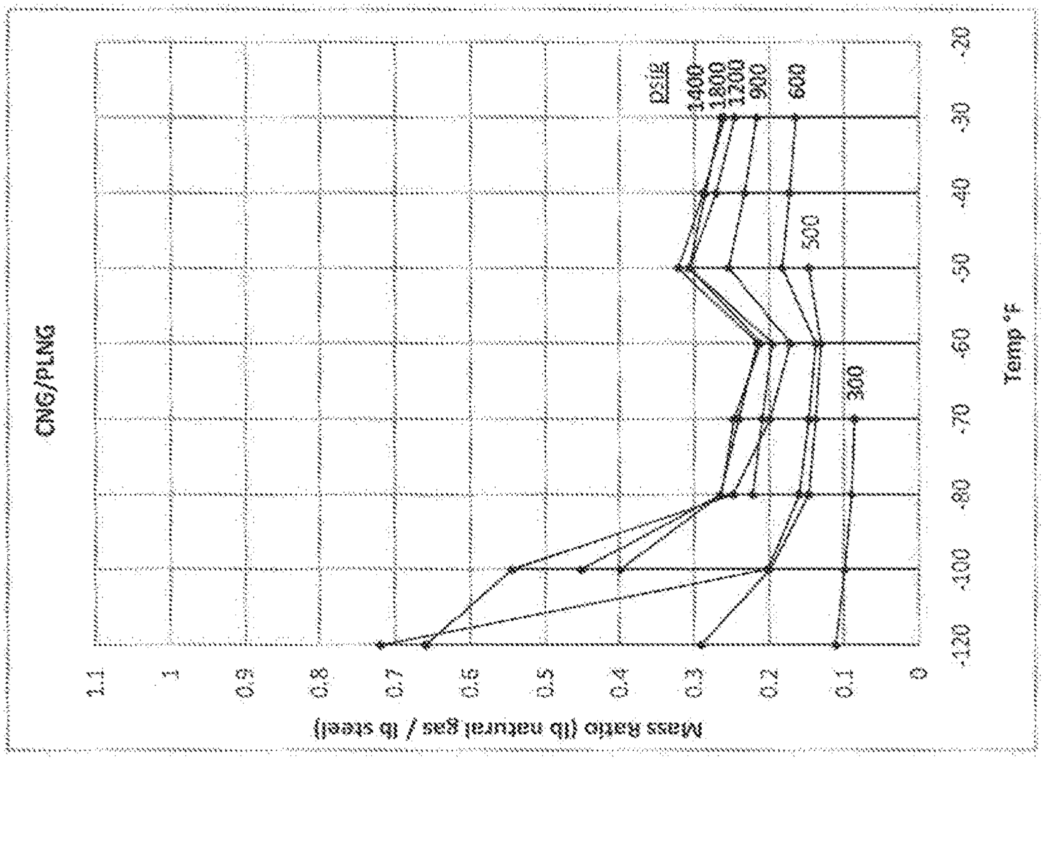

Referring to FIG. 15B, the containment mass ratios of the natural gas component in a CGL product mix under various pressure conditions and temperature at optimal concentrations of a NGL/LPG solvent with a butane bias of 75% C4 to 25% C3, which concentrations are the same as the concentration in FIG. 8B, are depicted. For instance, the containment mass ratio of the natural gas component in a CGL product mix, under pressure conditions ranging from about 300 psig to about 1800 psig and with temperature conditions from less than −80° F. to about −120° F., is in the range of 0.25 to 0.97 lb/lb. For the same storage conditions, as shown in FIG. 15A, CNG/PLNG storage here yields a range of 0.09 to 0.72 lb/lb. The containment mass ratio of the natural gas component in a CGL product mix, under pressure conditions ranging from about 300 psig to less than 900 psig with temperature conditions from −30° F. to about −120° F., is in the range of 0.18 to 0.97 lb/lb. For the same storage conditions, CNG/PLNG storage here yields a range of 0.09 to 0.72 lb/lb. The containment mass ratio of the natural gas component in a CGL product mix, under pressure conditions of about 300 psig to less than 900 psig with temperature conditions of less than −80° F. to about −120° F., is in the range of 0.25 to 0.97 lb/lb. For the same storage conditions, CNG/PLNG storage here yields a range of 0.09 to 0.25 lb/lb. More preferably, the containment mass ratio of the natural gas component in a CGL product mix under pressure conditions of about 500 psig to less than 900 psig and temperature conditions of less than −80° to about −120° F. is in the range of 0.37 to 0.97 lb/lb. For the same storage conditions, CNG/PLNG storage here yields a range of 0.13 to 0.72 lb/lb. As is readily apparent from FIGS. 15A and B, the containment mass ratio of the natural gas component of the CGL product mix exceeds the containment mass ratio of CNG and LNG for the same temperature and pressure within the ranges discussed above.

Figure 16C:
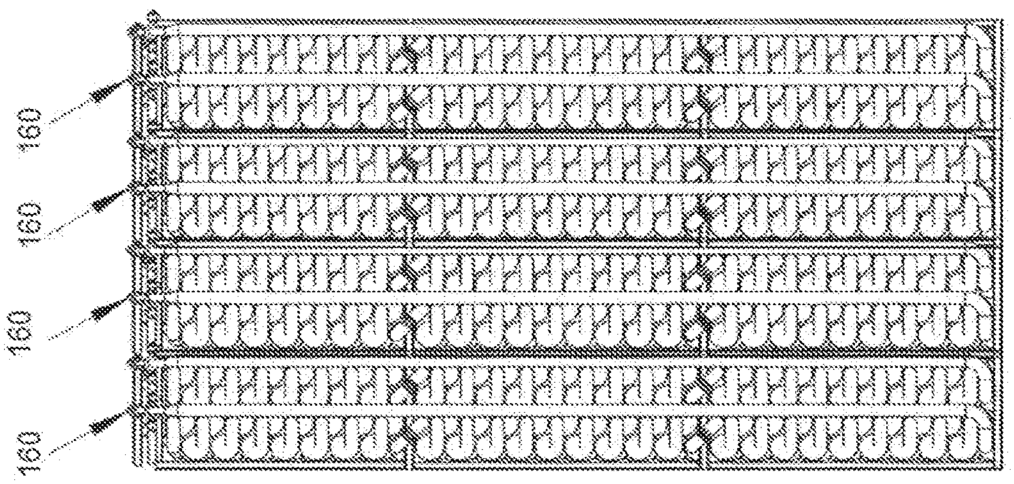
FIG. 16C is an end elevation view showing multiple pipe stack bundles coupled together side-by-side.
Figure 16B:
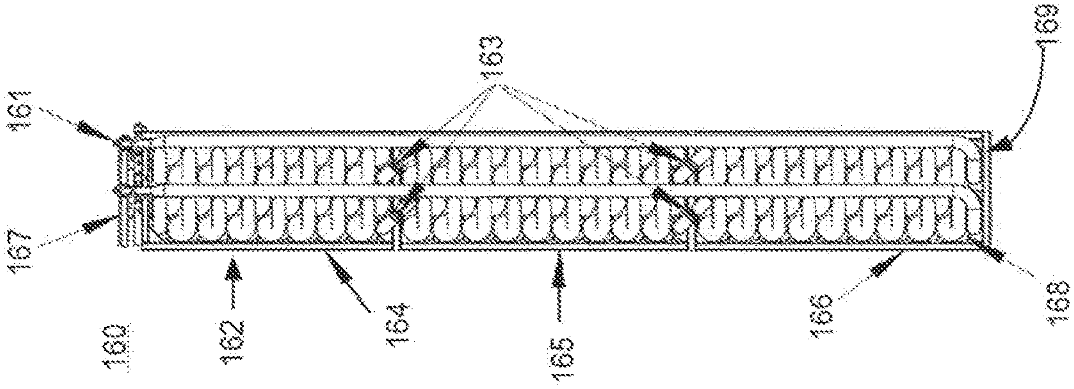
FIG. 16B is an opposite end elevation view of the embodiment of a pipe stack of FIG. 16A showing interconnecting fittings.
Figure 16A:
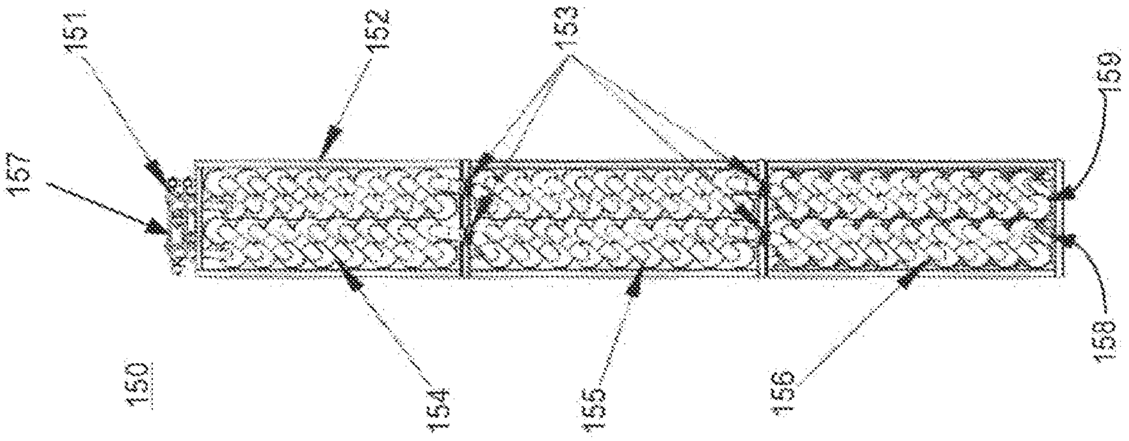
FIG. 16A is an end elevation view of an embodiment of a pipe stack showing interconnecting fittings that constitutes part of the pipeline containment system.

Turning to FIG. 16A which shows a pipe stack 150 in accordance with one embodiment. As depicted, the pipe stack 150 preferably includes an upper stack 154, a middle stack 155 and a lower stack 156 of pipe bundles each surrounded by a bundle frame 152 and interconnected through interstack connections 153. In addition, FIG. 16A shows a manifold 157 and manifold interconnections 151 that enable the pipe bundles to be sectioned into a series of short lengths 158 and 159 for shuttling the limited volume of the displacement fluid into and out of the partition undergoing loading or unloading.

FIG. 16B another embodiment of a pipe stack 160. As depicted, the pipe stack 160 preferably includes an upper stack 164, a middle stack 165 and a lower stack 166 of pipe bundles each surrounded by a bundle frame 162 and interconnected through interstack connections 163, as well as, a manifold 167 and manifold interconnections 161 that enable the pipe bundles to be sectioned into a series of short lengths 168 and 169 for shuttling the limited volume of the displacement fluid into and out of the partition undergoing loading or unloading.

As shown in FIG. 16C, several pipe stacks 160 can be coupled side-by-side to one another. The pipe (made from low temperature steels or composite materials) essentially forms a continuous series of parallel serpentine loops, sectioned by valves and manifolds. The vessel layout is typically divided into one or more insulated and covered cargo holds, containing modular racked frames, each carrying bundles of nested storage pipe that are connected end-to-end to form a single continuous pipeline.

Figures 16D, 16E, 16F:
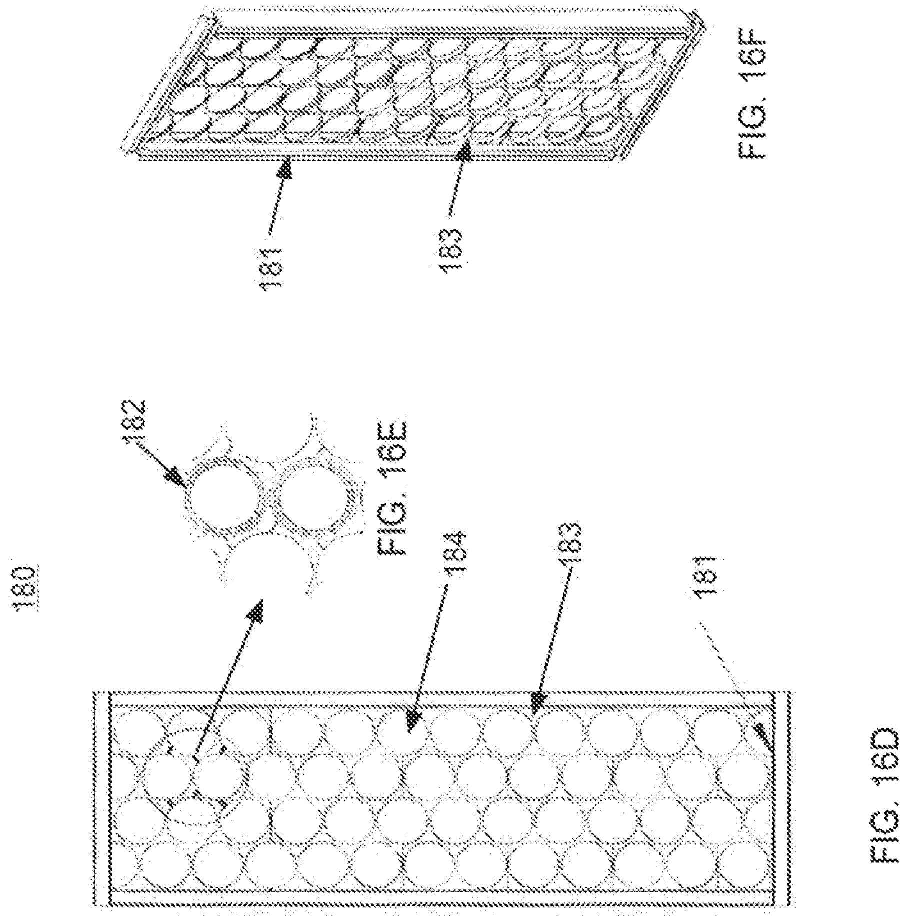
FIGS. 16D-16F are elevation, detail and perspective views of a pipe stack support member.

FIGS. 16D-16F show detail and assembly views of a pipe support 180 comprising a frame 181 retaining one or more pipe support members 183. The pipe support member 183 is preferably formed from engineered material affording thermal movement to each pipe layer without imposing the vertical loads of self mass of the stacked pipe 182 (located in voids 184) to the pipe below.

As shown in FIGS. 17A-17D, an enveloping framework is provided for holding a pipe bundle. The framework includes cross members 171 coupled to the frame 181 of the pipe supports (180 in FIG. 16D) and interconnecting pairs of the pipe support frames 181. The framing 181 and 171 and the engineered supports (183 in FIG. 16F) carry the vertical loads of pipe and cargo to the base of the hold. The framing is constructed in two styles 170 and 172, which interlock when pipe bundle stacks are placed side by side as shown in FIGS. 16C, 17A, 17B and 17C. This enables positive location and the ability to remove individual bundles for inspection and repair purposes.

Figure 17A:
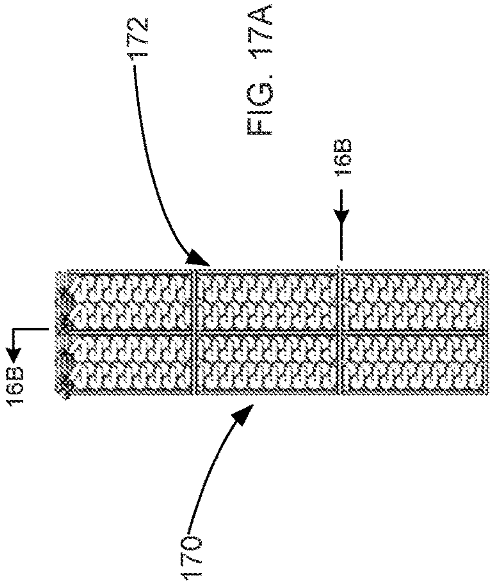
FIGS. 17A-17D are end elevation, stepped section (taken along line 17B-17B in FIG. 17A), plan and perspective views of bundle framing for the containment piping.
Figure 17D:
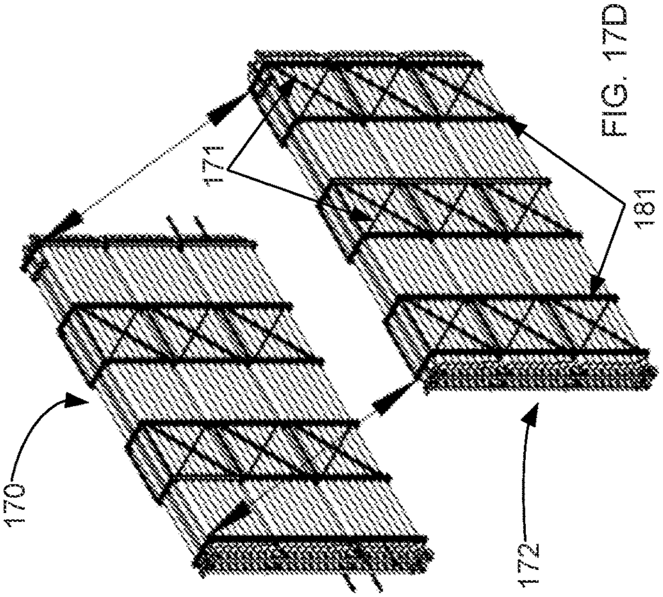
Figure 17B:
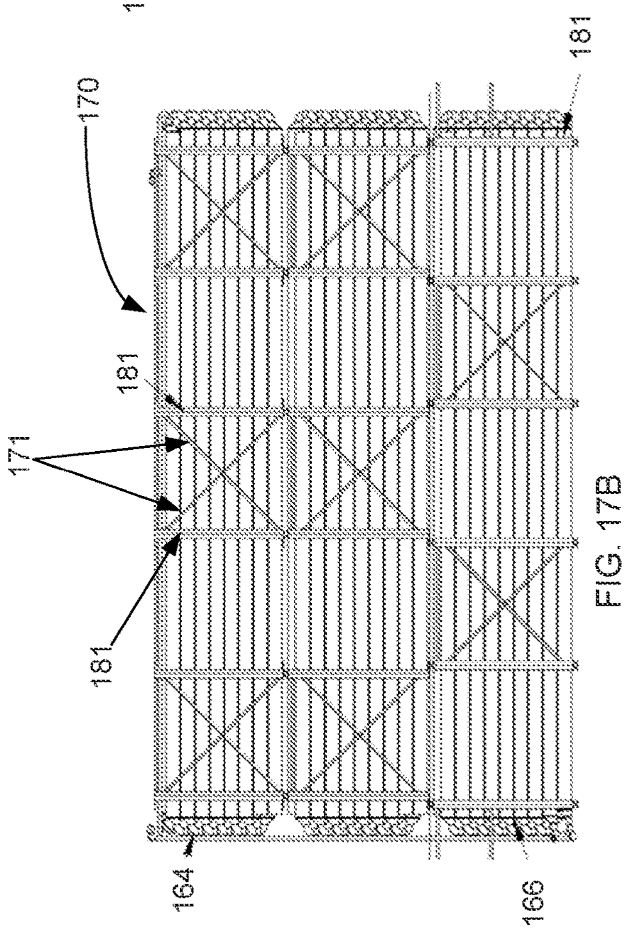
Figure 17C:
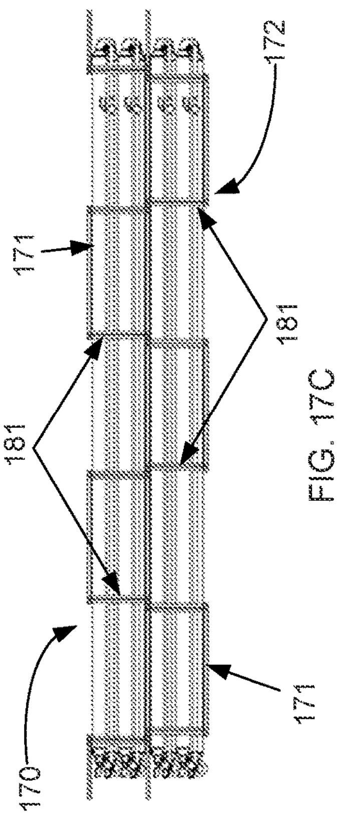
Figure 17E:
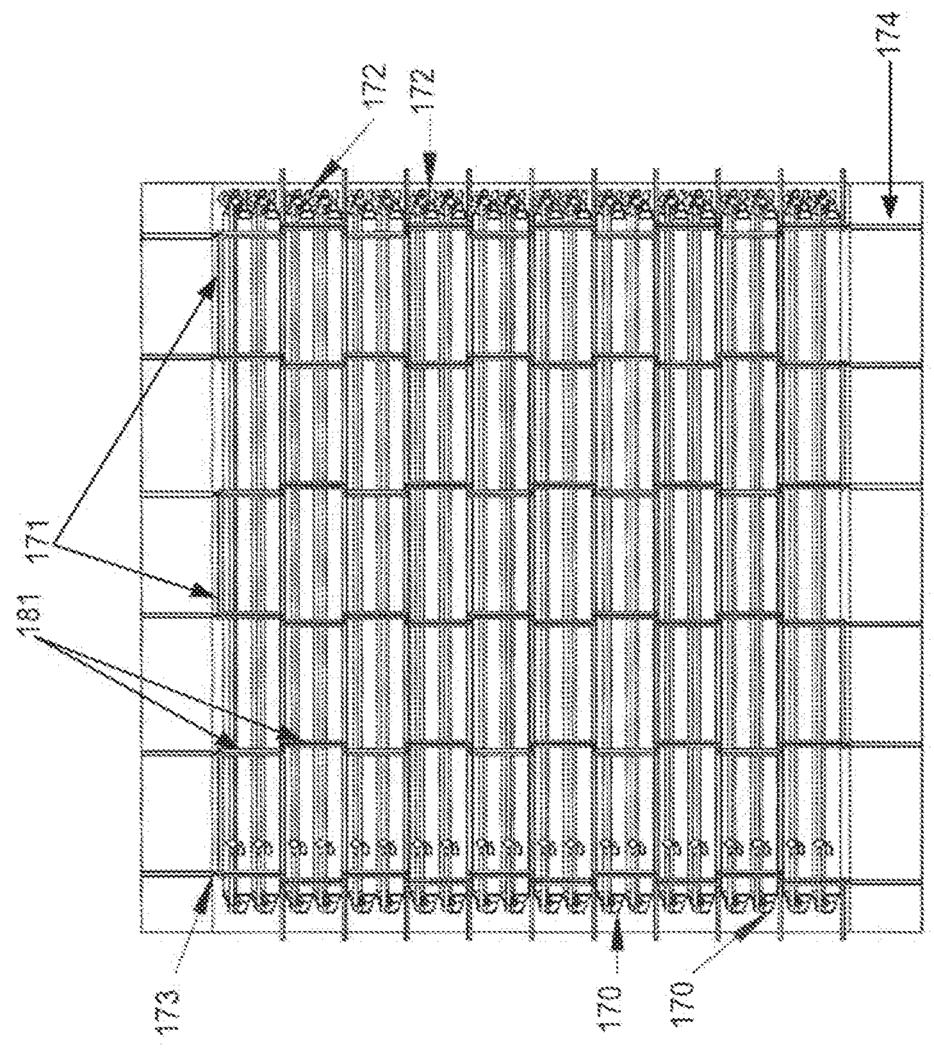
FIG. 17E is a plan view of interlocked stacked pipe bundles across the vessel hold.

FIG. 17E shows in plain view how the bundles 170 and 172, in turn, are stackable, transferring the mass of pipe and CGL cargo to the bundle framework 181 and 171 to the floor of the hold 174, and interlocking across, and along the walls of the hold 174 through elastic frame connections 173, to allow for positive location within the vessel, an important feature when the vessel is underway and subject to sea motion. The fully loaded condition of individual pipe strings additionally eliminates sloshing of the CGL cargo, which is problematic in other marine applications such as the transportation of LNG and NGLs. Lateral and vertical forces are thus able to be transferred to the structure of the vessel through this framework.

Figure 18A:
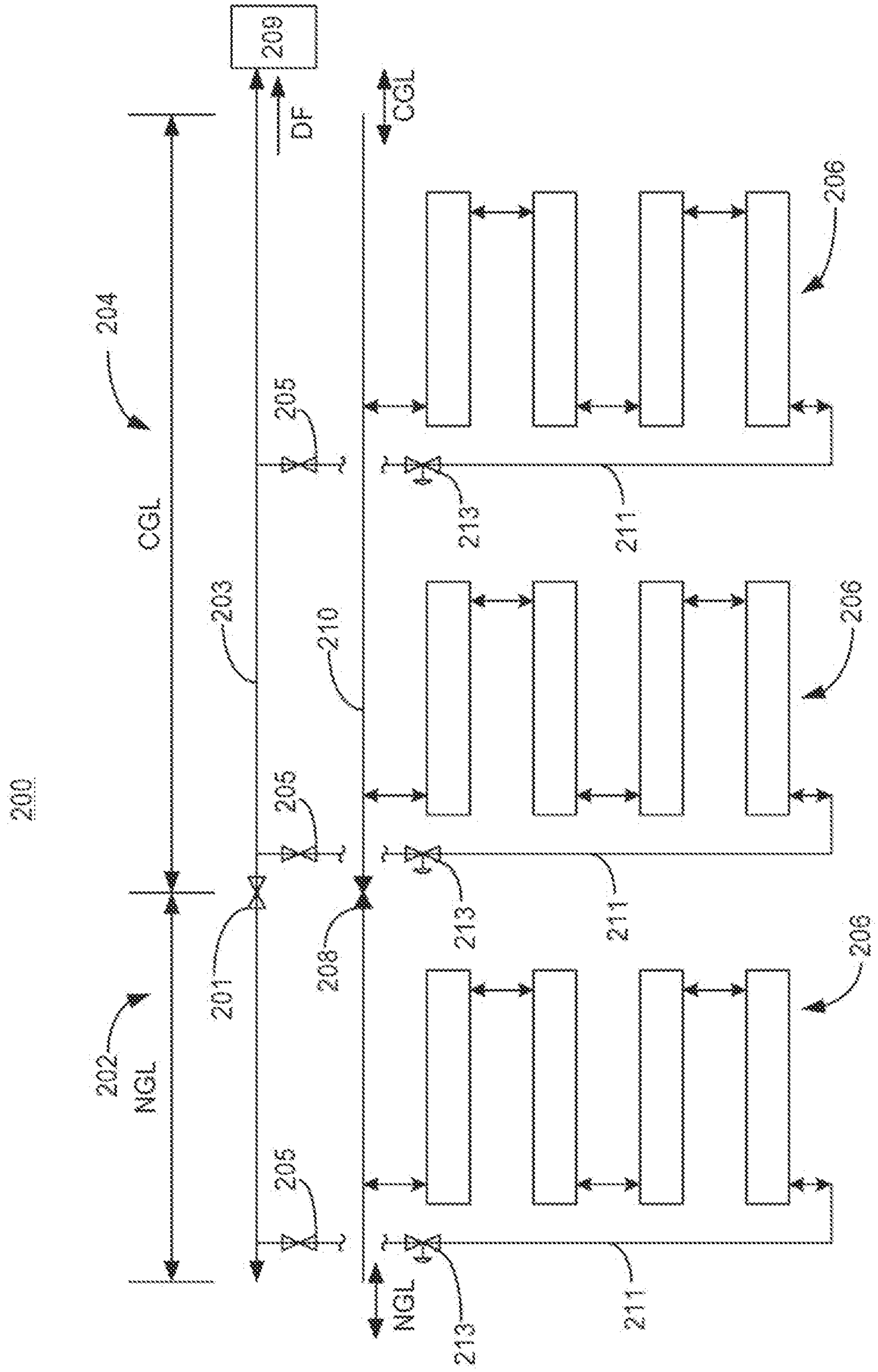
FIG. 18A is a schematic illustrating the use of a containment system for a partial load of NGL.

FIG. 18A shows the isolation capability of the containment system 200 which can then be used to carry NGLs, loaded and unloaded through an isolated section of displacement fluid piping. As shown, the containment system 200 can be divided up into NGL containment section 202 and CGL containment section 204. A loading and unloading manifold 210 is shown to include one or more isolation valves 208 to isolate one or more pipe bundle stacks 206A from other pipe bundle stacks 206. CGL and NGL products flow through the loading and unloading manifold 210 as they are loaded into and unloaded out of the pipe bundles 206A. A displacement fluid manifold 203 is shown coupled to a displacement fluid storage tank 209 and having one or more sectional valves 201. An inlet/outlet line 211 couples each of the pipe bundles 206 through isolation valves 205 to the displacement fluid manifold 203. NGL products are loaded and unloaded by isolating and bypassing the pressure control valve 213 in the inlet/outlet line 211 of displacement fluid system, and pressure control valve 214 of CGL inlet/outlet line to maintain the CGL and NGL products in a liquid state. The loading and unloading manifold 210 is normally connected directly to an offloading hose. However, for a refinement of specifications of the landed product, the NGL can be selectively routed through de-propanizer and de-butanizer vessels in a CGL offloading train.

Figure 18B:
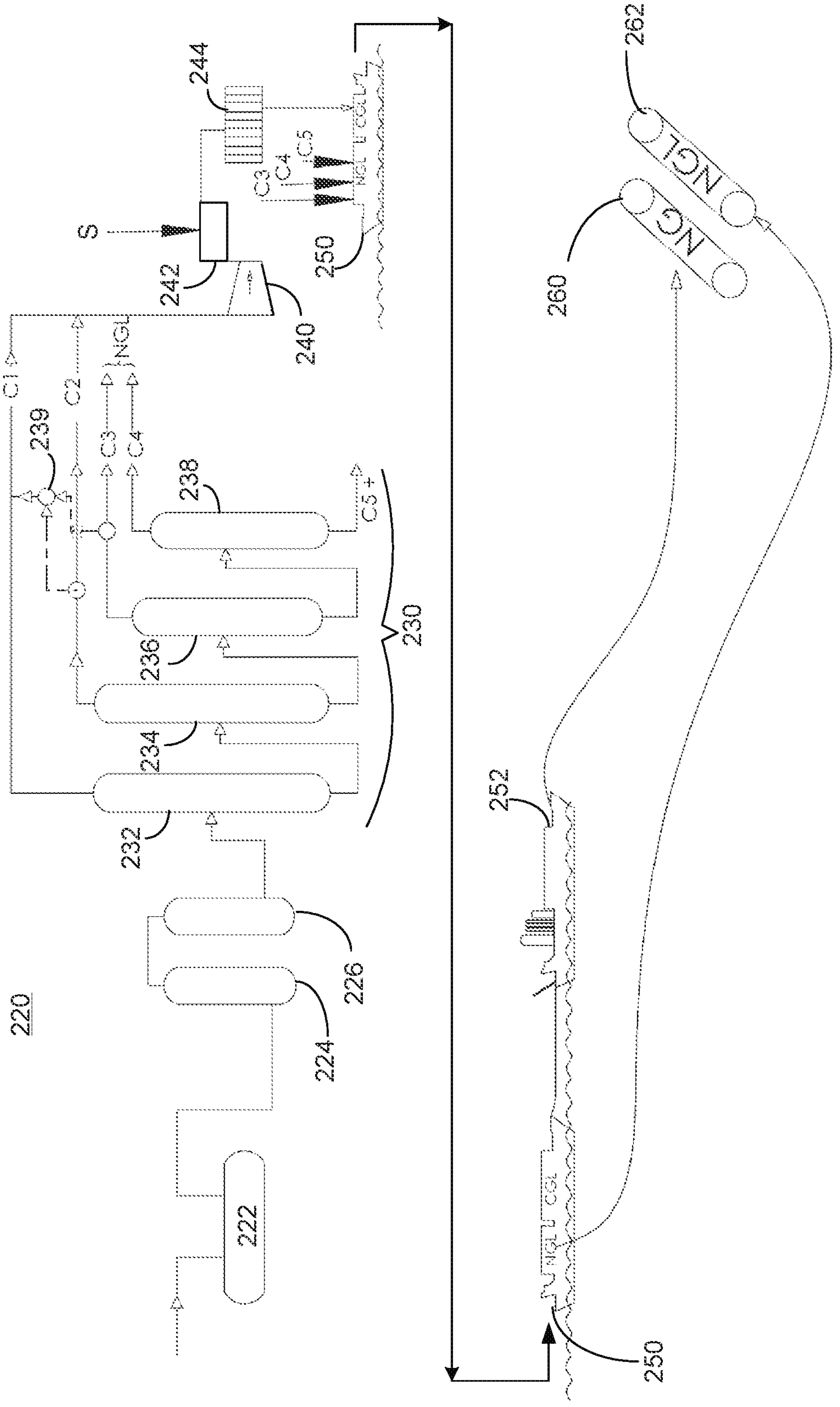
FIG. 18B is a schematic flow diagram illustrating raw gas being processed, conditioned, loaded, transported (in liquid form) and delivered as pipeline quality natural gas along with fractionated products to market.

Turning to FIG. 18B, the flexibility of the CGL system includes its ability to deliver fractionated products to various market specifications, control the BTU content of delivered gas, and cater to the variation in inlet gas components through the addition of modular processing units (e.g. amine unit—gas sweetening package) is illustrated. As depicted, in an example process 220, raw gas flows into the inlet gas scrubber 222 of a gas conditioning module for removal of water and other undesirable components prior to undergoing dehydration in a gas drying module 226, and If necessary, the gas is sweetened using an optional amine module 224 inserted to remove H2S, CO2, and other acid gases prior to dehydration. The gas then passes through a standard NGL extraction module 230, where it is split into lean natural gas and NGLs. The NGL stream is passed through a stabilization module before being routed to the NGL section of the shuttle carrier 250 pipeline containment system as described by FIG. 18B. Fractionation streams of C1, C2, C3, C4 and C5+ are obtained. It is at this point that the delivery spec BTU requirement of the light end flow stream of natural gas (predominantly C1 with some C2) is adjusted, if necessary, using a natural gas BTU/Wobbe adjustment module 239. The remaining fractionated products—NGLs-(C3 to C5+) are then directed for storage in designated sections of the shuttle carrier's pipeline containment system as described with regard to FIG. 18A. The natural gas (C1 and C2) is compressed in compressor module 240, mixed with the solvent S in a metering and solvent mixing module 242, and chilled in a refrigeration module 244 to produce CGL product which is also stored in a pipeline containment system on the carrier 250. The carrier 250 is also loaded with stabilized NGL products in its pipeline containment system that can be offloaded based on market requirements. Upon reaching the market location, the CGL product is unloaded from the carrier 250 to an offloading vessel 252, and, upon offloading of the natural gas product to a natural gas pipeline system 260, solvent is returned to the CGL carrier 250 from the offloading vessel 252, which is fitted with a solvent recovery unit. The transported NGLs can then be delivered directly into the market's NGL storage/pipeline system 262.

Figure 19B:
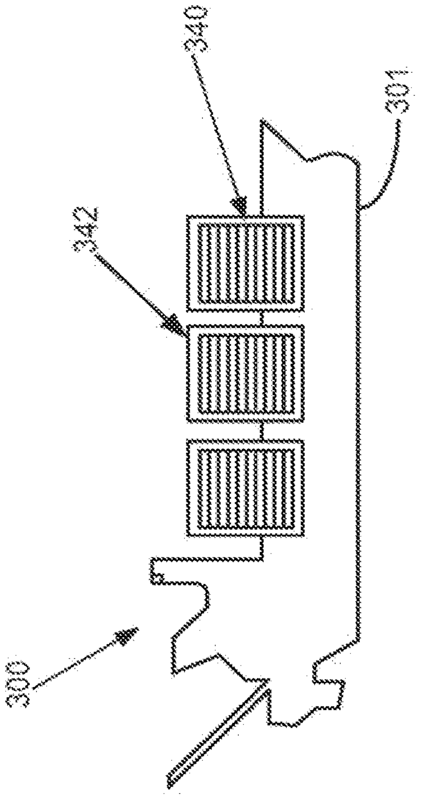
FIGS. 19A-19C are elevation, plan, and bow section views of a conversion vessel with integral carrier configuration.
Figure 19A:
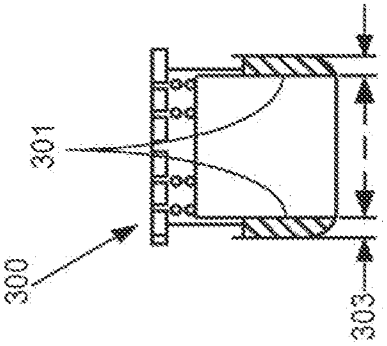
Figure 19C:
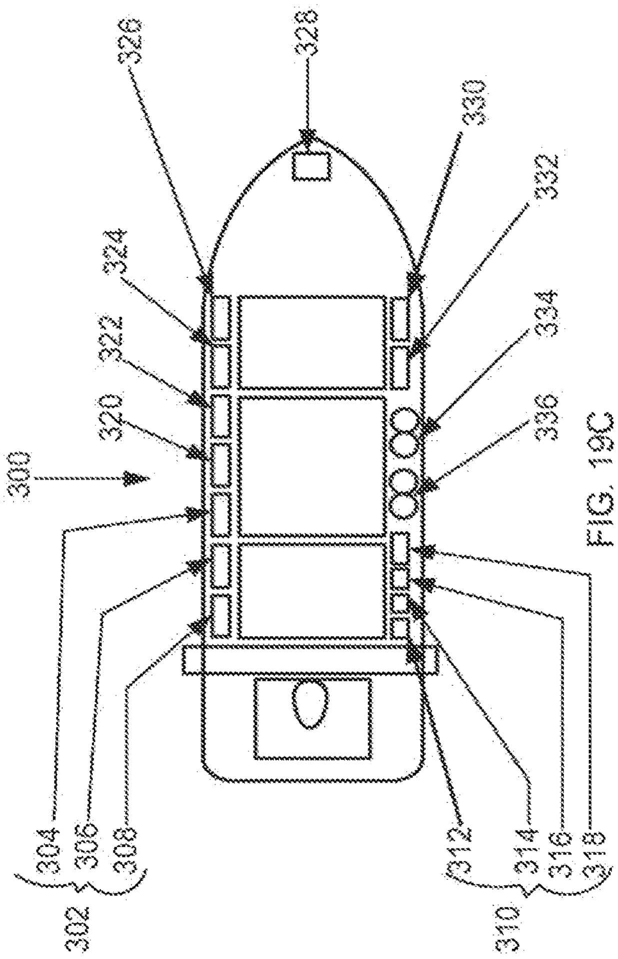

FIGS. 19A-19C show a preferred arrangement of a converted single hull oil tanker 300 with its oil tanks removed and replaced with new hold walls 301, to give essentially triple wall containment of the cargo carried within the pipe bundles 340 now filling the holds. The embodiment shown is an integral carrier 300 having the complete modular process train mounted on board. This enables the vessel to service an offshore loading buoy (see FIG. 10), prepare the natural gas for storage, produce the CGL cargo and then transport the CGL cargo to market, and during offloading, separate the hydrocarbon solvent from the CGL for reuse on the next voyage, and transfer the natural gas cargo to an offloading buoy/market facility. Depending on field size, natural production rate, vessel capacity, fleet size, quantity and frequency of vessel visits, as well as distance to markets, the system configuration can vary. For example, two loading buoys with overlapping tie up of vessels can reduce the need for between-load field storage required to assure continuous field production.

As noted above, the carrier vessel 300 advantageously includes modularized processing equipment including, for example, a modular gas loading and CGL production system 302 having a refrigeration heat exchanger module 304, a refrigerator compressor module 306, and vent scrubber modules 308, and a CGL fractionation offloading system 310 having a power generation module 312, a heat medium module 314, a nitrogen generation module 316, and a methanol recovery module 318. Other modules on the vessel include, for example, a metering module 320, a gas compressor module 322, gas scrubber modules 324, a fluid displacement pump module 330, a CGL circulation module 332, natural gas recovery tower modules 334, and solvent recovery tower modules 336. The vessel also preferably includes a special duty module space 326 and gas loading and offloading connections 328.

Figure 20A:
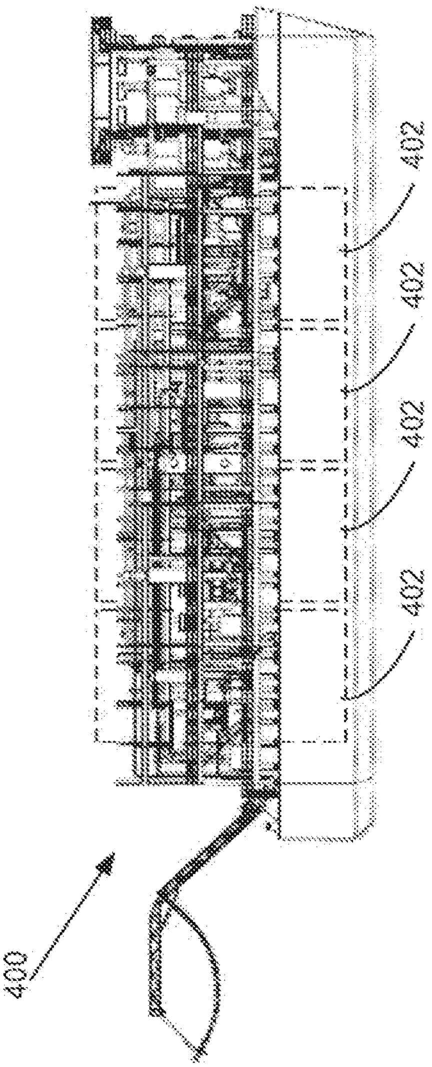
FIGS. 20A-20B are elevation and plan views of a loading barge for production gas processing, conditioning, and CGL production capabilities.
Figure 20B:
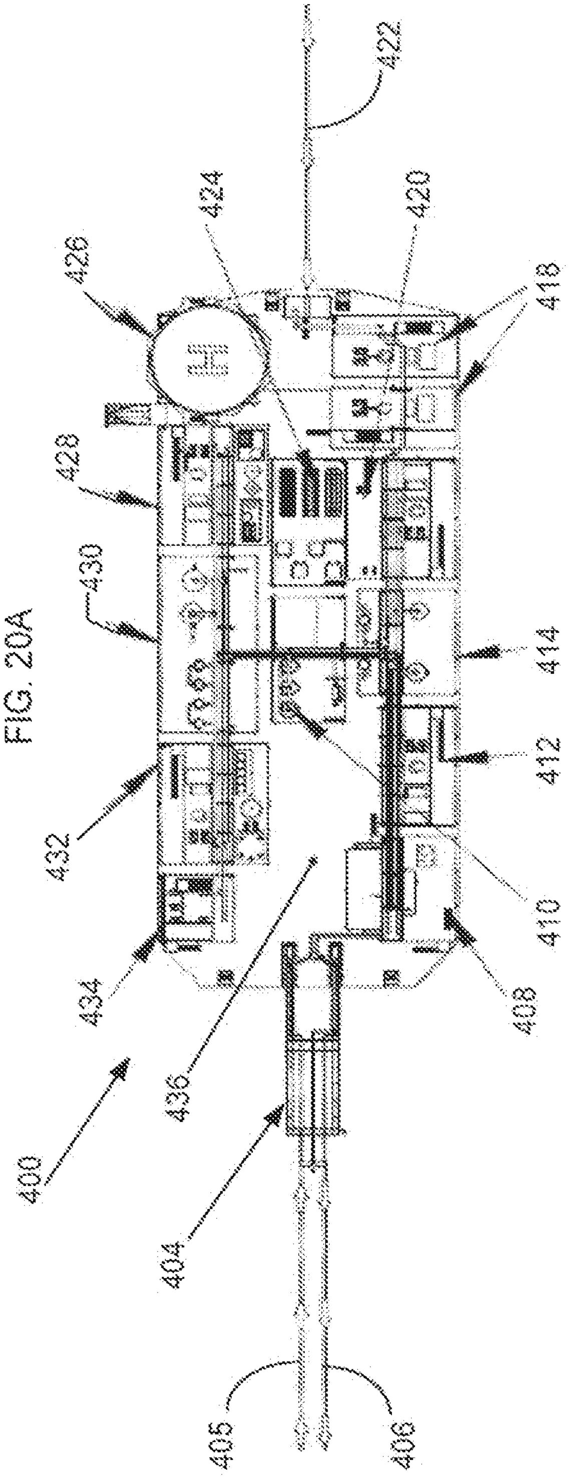

FIGS. 20A-20B show the general arrangement of a loading barge 400 carrying the process train to produce the CGL product. Equations of economics may dictate the need to share process equipment for a select fleet of vessels. A single processing barge, tethered in the production field, can serve a succession of vessels configured as "shuttle vessels". Where continuous loading/production is crucial to field operations and the critical point in the delivery cycle involves the timing of transportation vessel arrivals, a gas processing vessel with integral swing or overflow, buffer or production swing storage capacity is utilized in place of a simple loading barge (FPO). Correspondingly the shuttle transport vessels would be serviced at the market end by an offloading barge configured as per FIGS. 23A-23B. The burden of providing capital for loading and unloading process trains on every vessel in a custom fleet is thereby removed from the overall fleet cost by incorporating these systems on board vessels moored at the loading and unloading points of the voyage.

The loading barge 400 preferably includes CGL product storage modules 402 and modularized processing equipment including, for example, a gas metering module 408, a mol sieve module 410, gas compression modules 412, a gas scrubber module 414, power generation modules 418, a fuel treatment module 420, a cooling module 424, refrigeration modules 428 and 432, refrigeration heat exchanger modules 430, and vent module 434. In addition, the loading barge preferably includes a special duty module space 436, a loading boom 404 with a line 405 to receive solvent from a carrier and a line 406 to transmit CGL product to a carrier, a gas receiving line 422, and a helipad and control center 426.

The flexibility to deliver to any number of ports according to changes in market demand and the pricing of a spot market for natural gas supplies and NGLs would require that the individual vessel be configured to be self contained for offloading natural gas from its CGL cargo, and recycling the hydrocarbon solvent to onboard storage in preparation for use on the next voyage. Such a vessel now has the flexibility to deliver interchangeable gas mixtures to meet the individual market specifications of the selected ports.

Figure 21B:
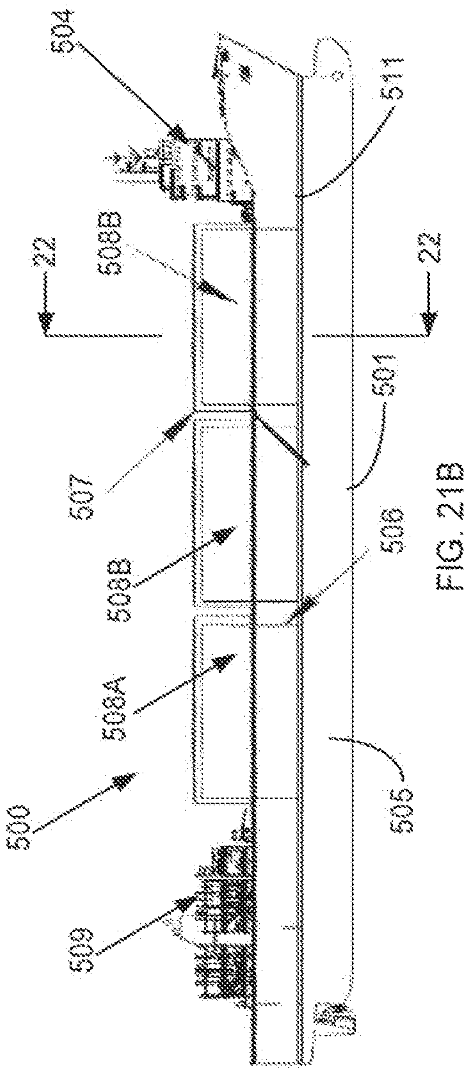
FIGS. 21A-21C are front section, side elevation and plan views of a new build shuttle vessel with CGL product transfer capabilities.
Figure 21A:
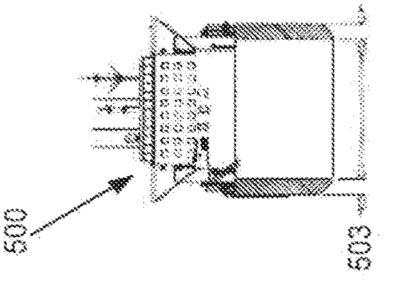
Figure 21C:
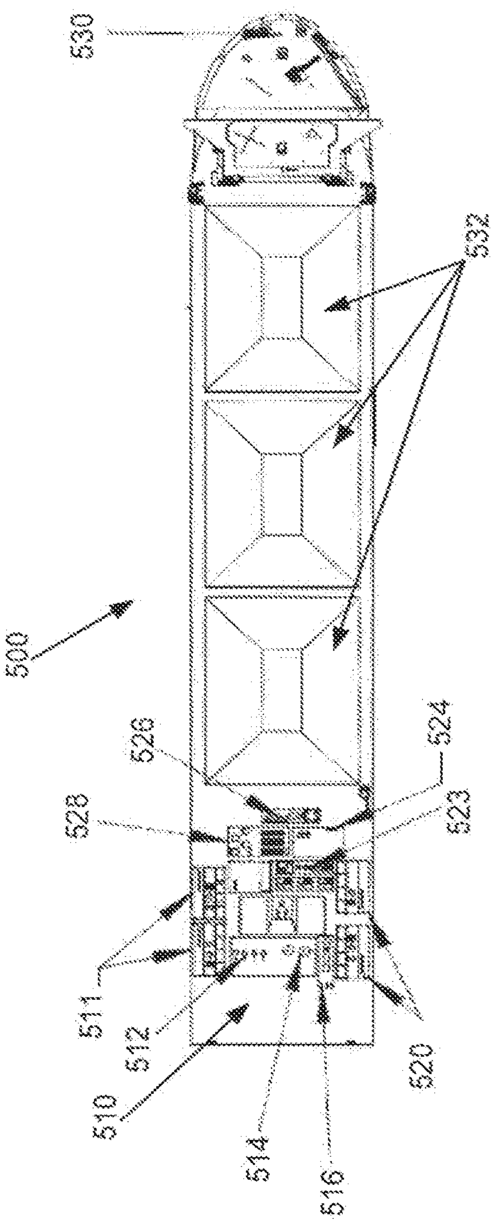

FIGS. 21A-C show a new build vessel 500 configured for CGL product storage and unloading to an offloading barge. The vessel is built around the cargo considerations of the containment system and its contents. Preferably, the vessel 500 includes a forward wheelhouse position 504, a containment location predominantly above the freeboard deck 511, and ballast below 505. The containment system 506 can be split into more than one cargo zone 508A-C, each of which is afforded a reduced crush zone 503 in the sides of the vessel 500. The interlocking bundle framing and boxed in design tied into the vessel structure permits this interpretation of construction codes and enables the maximum use of the hull's volume to be dedicated to cargo space.

At the rear of the vessel 500, deck space is provided for the modular placement of necessary process equipment in a more compact area than would be available on board a converted vessel. The modularized processing equipment includes, for example, displacement fluid pump modules 510, refrigeration condenser modules 512, a refrigeration scrubber and economizer module 514, a fuel process module 516, refrigeration compressor modules 520, nitrogen generator modules 522, a CGL product circulation module 524, a water treatment module 526, and a reverse osmosis water module 528. As shown, the containment fittings for the CGL product containment system 506 are preferably above the water line. The containment modules 508A, 508B and 508C of the containment system 506, which could include one or more modules, are positioned in the one or more containment holds 532 and enclosed in a nitrogen hood or cover 507.

Figure 22:
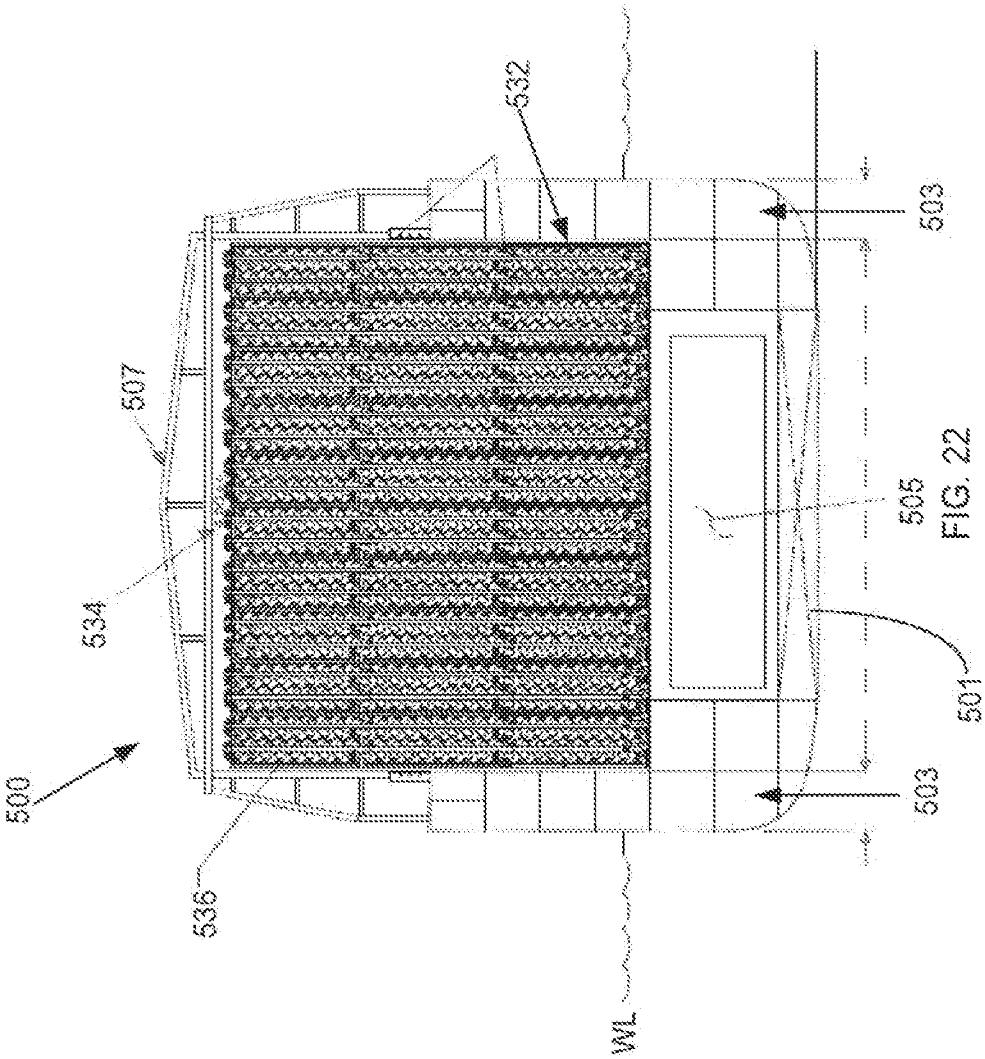
FIG. 22 is a cross section view of the storage area of a new build vessel (taken along line 22-22 in FIG. 21B) showing relative position of freeboard deck and reduced crush zone.

Turning to FIG. 22, a cross-section of the vessel 500 through a containment hold 532 shows crumple zones 503, which preferably are reduced to about 18% of overall width of the vessel 500, a ballast and displacement fluid storage area 505, stacked containment pipeline bundles 536 positioned within the hold 532, and the nitrogen hood 507 enclosing the pipeline bundles 536. As depicted, all manifolds 534 are above the pipeline bundles 534 ensuring that all connections are above the water line WL.

Figure 23A:
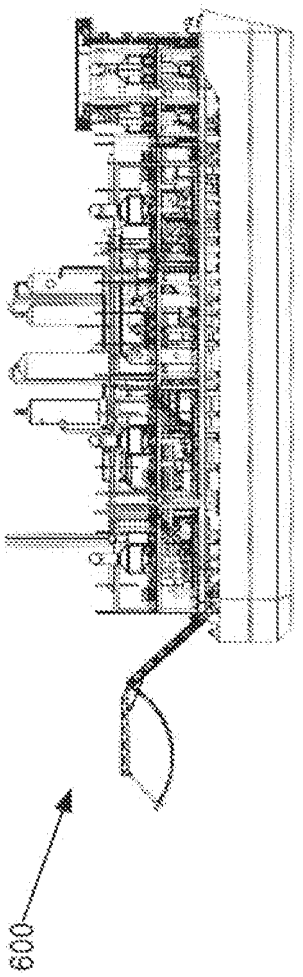
FIGS. 23A-23B are elevation and plan views of an offloading barge with capability of fractionation and solvent recovery for reuse.
Figure 23B:
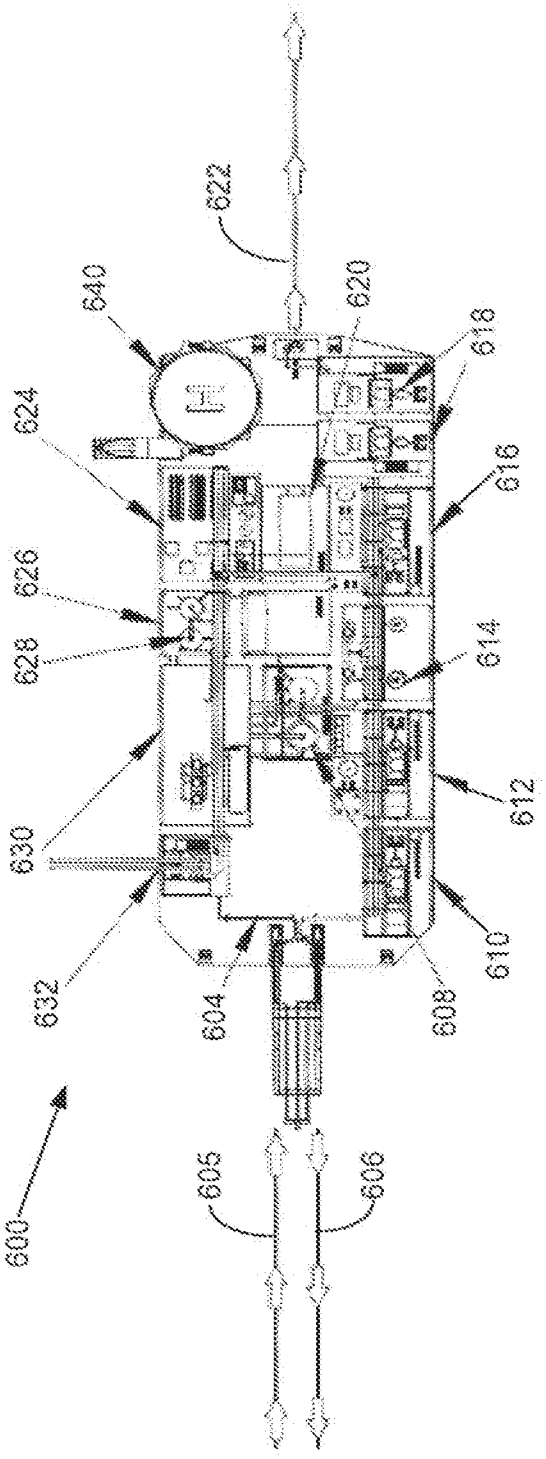

FIGS. 23A-23B show the general arrangement of an offloading barge 600 carrying the process train to separate the CGL product. The offloading barge 600 preferably includes modularized processing equipment including, for example, natural gas recovery column modules 608, gas compression modules, a gas scrubber module 614, power generation modules 618, gas metering modules 620, a nitrogen generation module 624, a distillation support module 626, solvent recovery column modules 628, and a cooling module 630, a vent module 632. In addition, the offloading barge 600, as depicted, includes a helipad and control center 640, a line 622 for transmitting natural gas to market transmission pipelines, an offloading boom 604 including a line 605 for receiving CGL product from a carrier vessel and a line 606 for returning solvent return to a carrier vessel.

Figure 24A:
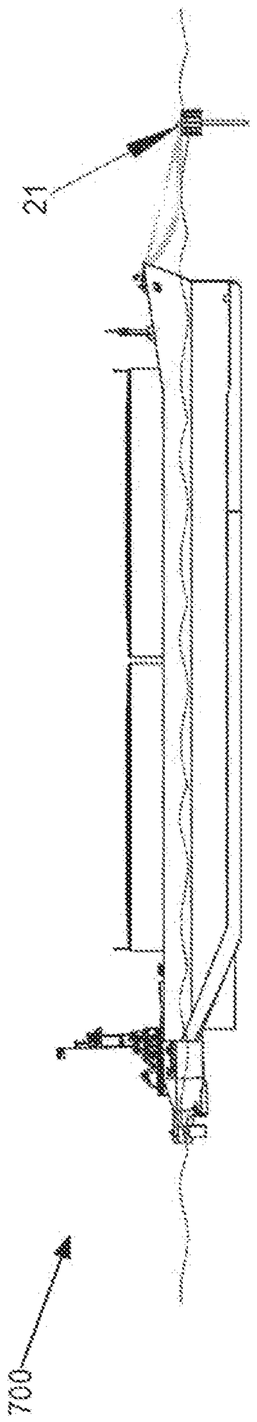
FIGS. 24A-D are elevation, plan and detail views of an articulated tug and barge with CGL shuttle and product transfer capabilities.
Figure 24B:
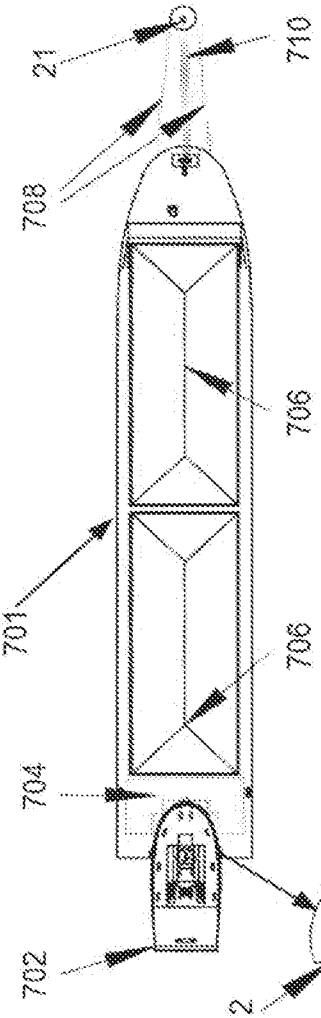
Figure 24C:
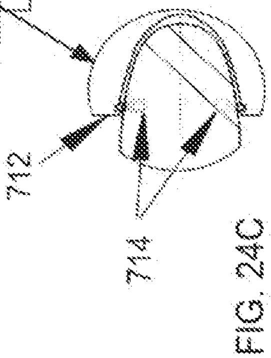
Figure 24D:
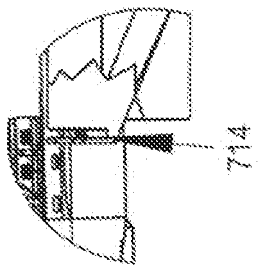

FIGS. 24A-24C shows the general arrangement of an articulated tug-barge shuttle 700 with an offloading configuration. The barge 700 is built around the cargo considerations of the containment system and its contents. Preferably, the barge 700 includes a tug 702 coupled to the barge 701 through a pin 714 and ladder 712 configuration. One or more containment areas 706 are provided predominantly above the freeboard deck. At the rear of the barge 701, deck space 704 is provided for the modular placement of necessary process equipment in a more compact area than would be available on board a converted vessel. The barge 700 further comprises an offloading boom including and offloading line 710 able to be connected to an offloading buoy 21 and houser lines 708.

The disclosed embodiments advantageously make a larger portion of the gas produced in the field available to the market place, due to low process energy demand associated with the embodiments. Assuming all the process energy can be measured against a unit BTU content of the natural gas produced in the field, a measure to depict percentage breakout of the requirements of each of the LNG, CNG and CGL process systems can be tabulated as shown below in Table 3.

If each of the aforementioned systems starts with a High Heat Value (HHV) of 1085 BTU/ft3, the LNG process reduces HHV to 1015 BTU/ft3 for transportation through extraction of NGLs. Make-up BTU spiking and crediting the energy content of extracted NGLs is included for LNG case to level the playing field. A heat rate of 9750 BTU per kW·hr for process energy demand is used in all cases.

TABLE 3

Energy Balance Summary for Typical LNG, CNG and CGL Systems

| | LNG System | CNG System (SG 0.6) | CGL System (SG 0.6 delivered) |
|---|---|---|---|
| Field gas | 100% | 100% | 100% |
| Process/Loading | 9.34% | 4% | 2.20% |
| NGL Byproduct | 7% | Not Applicable | Not Applicable |
| Unloading/Process | 1.65% | 5% | 1.12% |
| BTU Equivilance Spike | 4% | Not Applicable | Not Applicable |
| Available for Market | 78% (85% with NGL Credit) | 91% | 97% |

With credit for NGL's, the LNG process will sum up to 85% total value for Market delivery of BTUs—a quantity still less than the deliverable of the embodiments described herein. Results are typical for individual technologies. The data provided in Table 3 was sourced as follows: LNG—third party report by Zeus Energy Consulting Group 2007; CNG—Bishop U.S. Pat. No. 6,655,155; and CGL-internal study by SeaOne Maritime Corp.

Overall the disclosed embodiments provide a more practical and rapid deployment of equipment to access remote, as well as developed natural gas reserves, than has hitherto been provided by either LNG or CNG systems in all of their various configurations. Materials required are of a non exotic nature, and able to be readily supplied from standard oilfield sources and fabricated in a large number of industry yards worldwide.

Figure 25:
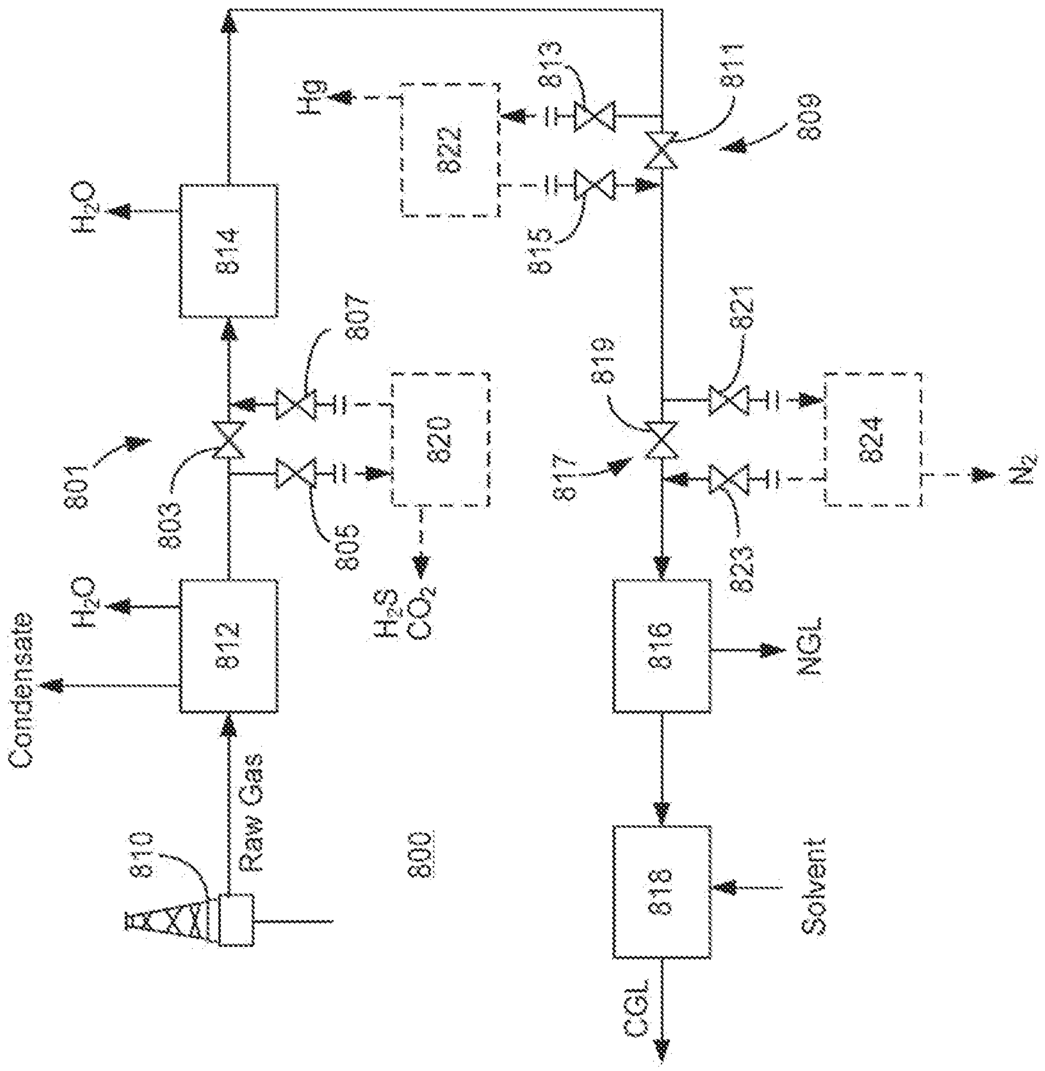
FIG. 25 is a flow diagram illustrating raw gas being processed through a modular loading process train.

Turning to FIG. 25, the typical equipment used on a loading process train 800 taking raw gas from a gas source 810 to become the liquid storage solution CGL is shown. As depicted, modular connection points 801, 809 and 817 allow for the loading process trains on the loading barge 400 depicted in FIGS. 20A and 20B and the integral carrier 300 depicted in FIGS. 19A-19C to cater to a wide variety of worldwide gas sources, many of which are deemed "non typical". As depicted, "typical" raw gas received from a source 810 is fed to separator vessel(s) 812 where settlement, choke or centrifugal action separates the heavier condensates, solid particulates and formation water from the gas stream. The stream itself passes through an open bypass valve 803 at modular connection point 801 to a dehydration vessel 814 whereby absorption in glycol fluid or by adsorption in packed desiccant the remaining water vapor is removed. The gas stream then flows through open bypass valves 811 and 819 at modular connection points 809 and 817 to a module 816 for the extraction of NGL. This typically is a turbo expander where the drop in pressure causes cooling resulting in the fall-out of NGLs from the gas stream. Older technology using oil absorption system could alternatively be used here. The natural gas is then conditioned to prepare the CGL liquid storage solution: The CGL solution is produced in a mixing train 818 by chilling the gas stream and introducing it to the hydrocarbon solvent in a static mixer as discussed with regard to FIG. 2A above. Further cooling and compression of the resulting CGL prepares the product for storage.

However, gas with high content condensates could be handled by providing additional separator capacity to the separator equipment 812. For natural gas mixes with undesirable levels of acid gasses such as CO2 and H2S, Chlorides, Mercury and Nitrogen the bypass valves 803, 811 and 819 at modular connection points 801, 809 and 817 can be closed as needed and the gas stream routed through selectively attached process modules 820, 822 and 824 tied in to the associated branch piping and isolation valves 805, 807, 813, 815, 821 and 823 shown at each by pass station 801, 809 and 817. For example, raw gas from the Malaysian deepwater fields of Sabah and Sarawak containing unacceptable levels of acid gas could be routed around a closed by-pass valve 803 and through open isolation valves 805 and 807 and processed in an attached module 820 where amine absorption and iron sponge systems extract the CO2, H2S, and sulfur compounds. A process system module for the removal of mercury and chlorides is best positioned downstream of dehydration unit 814. This module 822 takes the gas stream routed around a closed by-pass valve 811 through open isolation valves 813 and 815, and comprises a vitrification process, molecular sieves or activated carbon filters. For raw gas with high levels of nitrogen as found in some areas of the Gulf of Mexico, the gas stream is routed around a closed by-pass valve 819 and through open isolation valves 821 and 823, passing the natural gas stream through a selected process module 824 of suitable capacity to remove nitrogen from the gas stream. Available process types include membrane separation technology, absorptive/adsorptive tower and a cryogenic process attached to the vessel's nitrogen purge system and storage pre chilling units.

The extraction process described above can also provide a first stage to the NGL module 816, providing additional capacity required to deal with high liquids mixes such as those found in the East Qatar field.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative and follows industry practices, unless otherwise stated, and the invention can be performed using different or additional process actions as they become available, or a different combination or ordering of process actions. As another example, each feature of one embodiment can be mixed and matched with other features shown in other embodiments. Features and processes known to those of ordinary skill may similarly be incorporated as desired. Additionally and obviously, features may be added or subtracted as required by service conditions. Accordingly, the invention is not to be restricted except in light of the attached claims and their equivalents.

The invention claimed is:

1. A process of storing a mixture of natural gas and a hydrocarbon solvent to yield greater storage densities for the natural gas in the mixture than compressed natural gas at the same storage conditions, comprising:

loading a single phase liquid medium in a containment system, the single phase liquid medium comprising natural gas absorbed in a liquid hydrocarbon solvent, wherein the mol percentage of the liquid hydrocarbon solvent combined with the natural gas is a function of the gas composition of the natural gas, the gas composition of the liquid hydrocarbon solvent, and the storage pressure and temperature conditions to optimize the storage densities of the natural gas of the single phase liquid medium for pressures and temperatures at which the single phase liquid medium is set to be stored, and storing the single phase liquid medium in the containment system with the natural gas of the single phase liquid medium being stored at storage densities that exceed storage densities of compressed natural gas at storage same storage pressure and temperature.

2. The process of claim 1, wherein the hydrocarbon solvent is ethane, propane or butane, or a combination of two or more of ethane, propane and butane constituents.

3. The process of claim 1, wherein the natural gas is methane.

4. The process of claim 1, wherein the containment system is adapted to store the single phase liquid medium with storage densities for the natural gas in the single phase liquid medium that exceeds the storage densities of compressed natural gas (CNG) for the same storage pressures and temperatures, wherein the containment system is adapted to store the single phase liquid medium at temperatures in a range of less than −80 F to about −120 F and at pressures in a range of 300 psig to 900 psig.

5. The process of claim 4, wherein the containment system is adapted to store the single phase liquid medium at temperatures in a range of less than −80 F to about −120 F and at pressures in a range of 500 psig to 900 psig.

6. The process of claim 4, wherein the containment system includes a looped pipeline system.

7. The process of claim 6, wherein the looped pipeline system adapted to store the single phase liquid medium at pressures in a range from 500 psig to 900 psig.

8. The process of claim 6, wherein the looped pipeline system includes recirculation facilities adapted to control temperature and pressure.

9. The process of claim 6, wherein the looped pipeline system is configured for serpentine fluid flow pattern between adjacent pipes.

10. The process of claim 1 further comprising the step of recovering the natural gas unaltered from the single phase liquid medium.

11. The process of claim 1 further comprising the steps of reducing the pressure of the single phase liquid medium to separate the natural gas and liquid hydrocarbon solvent, and heating the natural gas to restore its gaseous state.

12. The process of claim 11 further comprising the step of storing the liquid hydrocarbon solvent in liquid phase for future use.

13. The process of claim 1, wherein the liquid hydrocarbon solvent is ethane (C2) and the volumetric ratio of the natural gas component of the single phase liquid medium being in a range of about 270 to about 414.

14. The process of claim 1, wherein the liquid hydrocarbon solvent is propane (C3) and the volumetric ratio of the natural gas component of the single phase liquid medium being in a range of about 196 to about 423.

15. The process of claim 1, wherein the liquid hydrocarbon solvent is butane (C4) and the volumetric ratio of the natural gas component of the single phase liquid medium being in a range of about 158 to about 423.

16. The process of claim 1, wherein the hydrocarbon solvent is a natural gas liquid (NGL) solvent with a propane bias of 75% C3 to 25% C4 and the volumetric ratio of the natural gas component of the single phase liquid medium being in a range of about 187 to about 423.

17. The process of claim 1, wherein the hydrocarbon solvent is a natural gas liquid (NGL) solvent with a butane bias of 75% C4 to 25% C3 and the volumetric ratio of the natural gas component of the single phase liquid medium being in a range of about 167 to about 423.

18. A process of storing a mixture of natural gas and a hydrocarbon solvent to yield greater storage densities for the natural gas in the mixture than compressed natural gas at the same storage conditions, comprising:

loading a single phase liquid medium in a containment system, the single phase liquid medium comprising natural gas absorbed in a liquid hydrocarbon solvent, wherein the mol percentage of the liquid hydrocarbon solvent combined with the natural gas is a function of the gas composition of the natural gas, the gas composition of the liquid hydrocarbon solvent, and the storage pressure and temperature conditions to optimize the storage densities of the natural gas of the single phase liquid medium for pressures and temperatures at which the single phase liquid medium is set to be stored, calculating a solvent-to-gas ratio of the single phase liquid medium to achieve an maximum net volumetric ratio of the natural gas in the single phase liquid medium over a range of temperatures and pressures the single phase liquid medium is to be stored at in the containment system, and storing the single phase liquid medium in the containment system with the natural gas of the single phase liquid medium being stored at storage densities that exceed storage densities of compressed natural gas for at the same storage pressure and temperature.

19. The process of claim 18, wherein the step of calculating a solvent-to-gas ratio includes calculating a net volumetric ratio of the natural gas in the single phase liquid medium over a range of storage temperatures and pressures and solvent-to-gas ratios to determine a solvent-to-gas ratio that maximizes the net volumetric ratio of the natural gas in the single phase liquid medium.

20. The process of claim 18, further comprising the steps of measuring a solvent-to-gas ratio of the single phase liquid medium prior to cooling the single phase liquid medium to a storage temperature, comparing the measured solvent-to-gas ratio of the single phase liquid medium with the solvent-to-gas ratio of the single phase liquid medium, and adjusting the mol percentage of the liquid hydrocarbon solvent to be combined with the natural gas as a function of the measured solvent-to-gas ratio of the single phase liquid medium to meet the solvent-to-gas ratio of the single phase liquid medium.

* * * * *